(12) United States Patent
Nishino et al.

(10) Patent No.: US 12,485,641 B2
(45) Date of Patent: Dec. 2, 2025

(54) LAMINATED GLASS INTERLAYER FILM AND LAMINATED GLASS

(71) Applicant: SEKISUI CHEMICAL CO., LTD., Osaka (JP)

(72) Inventors: Hiromitsu Nishino, Shiga (JP); Koji Kido, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/792,039

(22) PCT Filed: Mar. 30, 2021

(86) PCT No.: PCT/JP2021/013565
§ 371 (c)(1),
(2) Date: Jul. 11, 2022

(87) PCT Pub. No.: WO2021/200961
PCT Pub. Date: Oct. 7, 2021

(65) Prior Publication Data
US 2023/0059935 A1 Feb. 23, 2023

(30) Foreign Application Priority Data
Mar. 30, 2020 (JP) ................. 2020-060539

(51) Int. Cl.
*B32B 17/10* (2006.01)
*B32B 3/26* (2006.01)
(Continued)

(52) U.S. Cl.
CPC ............. *B32B 3/263* (2013.01); *B60K 35/23* (2024.01); *B32B 17/10* (2013.01); *B32B 27/08* (2013.01);
(Continued)

(58) Field of Classification Search
CPC ............. B32B 17/10568; B32B 3/263; B32B 17/10036; B32B 17/10761; B32B 27/30;
(Continued)

(56) References Cited

U.S. PATENT DOCUMENTS

2007/0009714 A1\* 1/2007 Lee ................... B32B 17/10761
428/172
2007/0148472 A1 6/2007 Masaki et al.
(Continued)

FOREIGN PATENT DOCUMENTS

CN 103786391 5/2014
CN 107000386 8/2017
(Continued)

OTHER PUBLICATIONS

International Search Report (ISR) issued Jun. 29, 2021 in International (PCT) Application No. PCT/JP2021/013565.
(Continued)

*Primary Examiner* — Megha M Gaitonde
(74) *Attorney, Agent, or Firm* — Wenderoth, Lind & Ponack, L.L.P.

(57) ABSTRACT

Provided is an interlayer film for laminated glass capable of enhancing the sound insulating property of the laminated glass. An interlayer film for laminated glass according to the present invention is an interlayer film, for laminated glass, having a two or more-layer structure, the interlayer film includes one end and the other end being on an opposite side of the one end and having a thickness larger than a thickness of the one end, at least one layer having a glass transition temperature of less than 15° C., and a region where a value of Y/X is 0.12 or more when the interlayer film has a thickness of X μm and a total thickness of the at least one layer having a glass transition temperature of less than 15° C. is denoted by Y μm, and the interlayer film has an average
(Continued)

thickness of each surface layer, in a region from a position of 100 mm to a position of 400 mm from the one end toward the other end, of less than 300 μm.

24 Claims, 7 Drawing Sheets

(51) Int. Cl.
  *B60K 35/23* (2024.01)
  *B32B 27/08* (2006.01)
  *B32B 27/30* (2006.01)
  *B60K 35/40* (2024.01)
  *B60K 35/50* (2024.01)
  *B60K 35/60* (2024.01)

(52) U.S. Cl.
  CPC ....... *B32B 27/306* (2013.01); *B32B 2307/414* (2013.01); *B32B 2307/581* (2013.01); *B32B 2307/732* (2013.01); *B32B 2551/00* (2013.01); *B60K 35/415* (2024.01); *B60K 35/50* (2024.01); *B60K 35/60* (2024.01)

(58) Field of Classification Search
  CPC . B32B 27/08; B32B 2315/08; B32B 2329/06; B32B 2605/006; B32B 2605/08; B32B 17/10587; B32B 17/1055; B32B 17/10779; B32B 27/22; B32B 27/306; C08J 5/18; C08J 2329/14; G02B 2027/012; G02B 27/01; B60J 1/001; B60J 1/02; B60K 2370/1529; Y10T 428/24479; Y10T 428/24612; Y10T 428/24942; Y10T 428/2495; Y10T 428/24959
  USPC .......................... 428/156, 172, 212, 213, 214
  See application file for complete search history.

(56) References Cited

U.S. PATENT DOCUMENTS

| | | | |
|---|---|---|---|
| 2016/0159041 A1* | 6/2016 | Lu | .................... B32B 17/10568 428/161 |
| 2016/0168353 A1 | 6/2016 | Spangler et al. | |
| 2016/0200076 A1 | 7/2016 | Lu | |
| 2018/0162105 A1* | 6/2018 | Kawate | ................. B32B 27/322 |
| 2018/0272662 A1 | 9/2018 | Lu | |
| 2018/0281351 A1 | 10/2018 | Nakamura et al. | |
| 2021/0268773 A1 | 9/2021 | Arishima | |

FOREIGN PATENT DOCUMENTS

| | | |
|---|---|---|
| CN | 107848881 | 3/2018 |
| EP | 3 330 238 | 6/2018 |
| EP | 3 388 402 A1 | 10/2018 |
| EP | 3 388 402 B1 | 3/2020 |
| JP | 2007-223883 | 9/2007 |
| JP | 2011-88785 | 5/2011 |
| WO | 2016/094239 | 6/2016 |
| WO | 2017/022686 | 2/2017 |
| WO | 2020/004577 | 1/2020 |

OTHER PUBLICATIONS

International Preliminary Report on Patentability and Written Opinion of the International Searching Authority issued Sep. 29, 2022 in International (PCT) Application No. PCT/JP2021/013565.

Extended European Search Report with the European Search Opinion issued Apr. 2, 2024 in corresponding European Patent Application No. 21782352.5, pp. 1-7.

* cited by examiner

[FIG. 1]
(a)
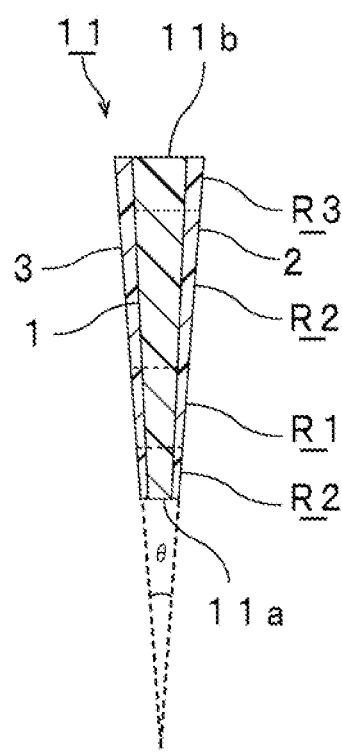
(b)
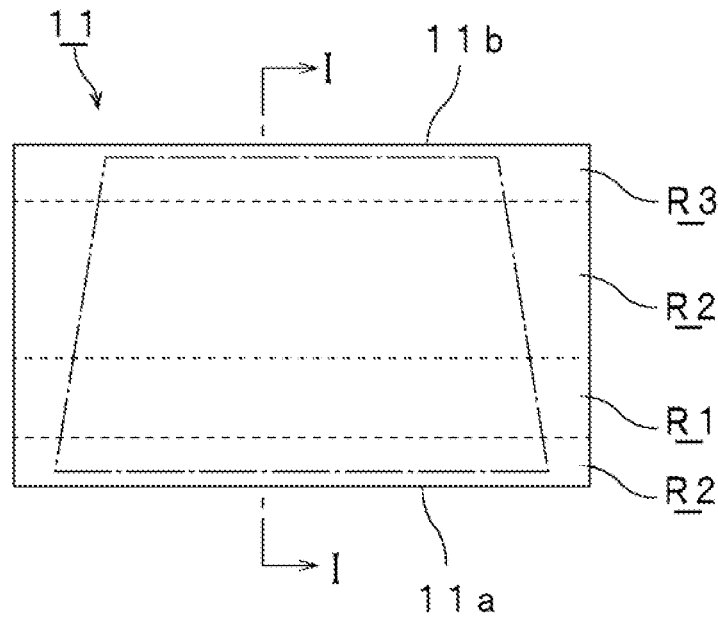

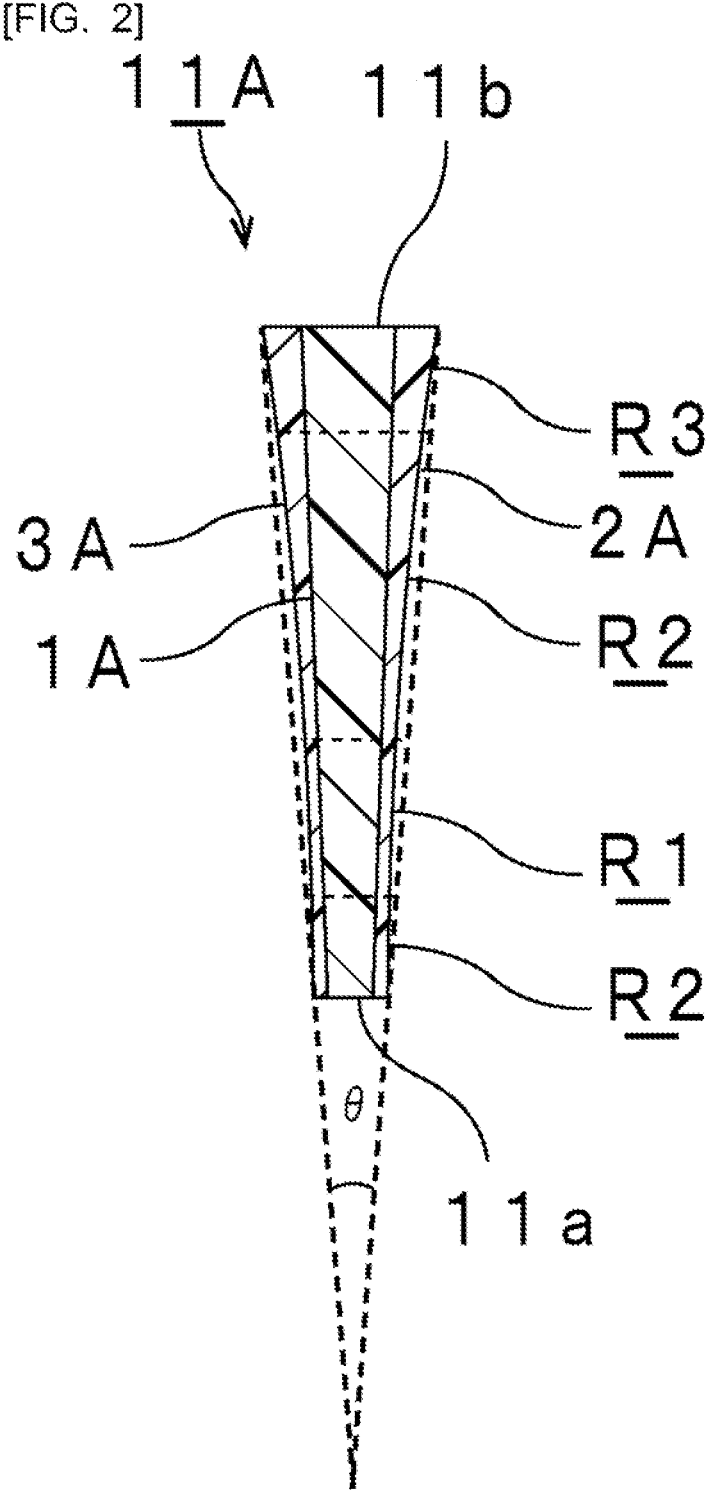

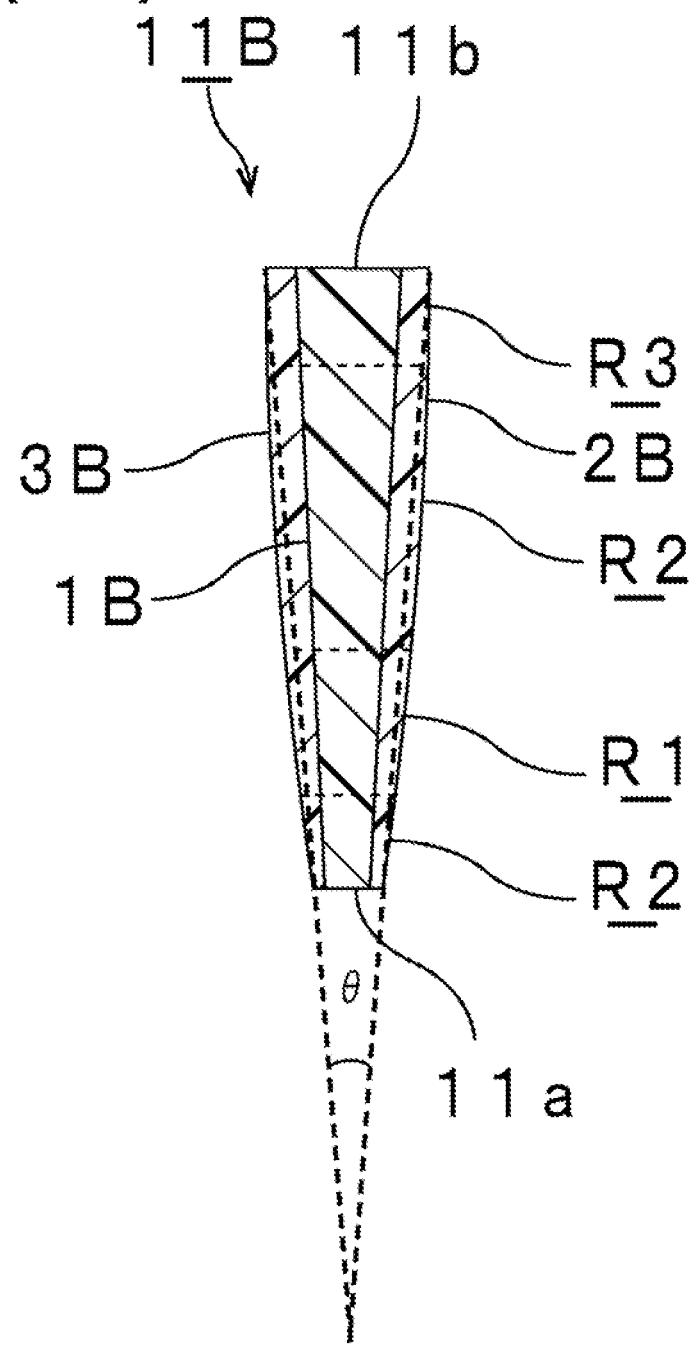

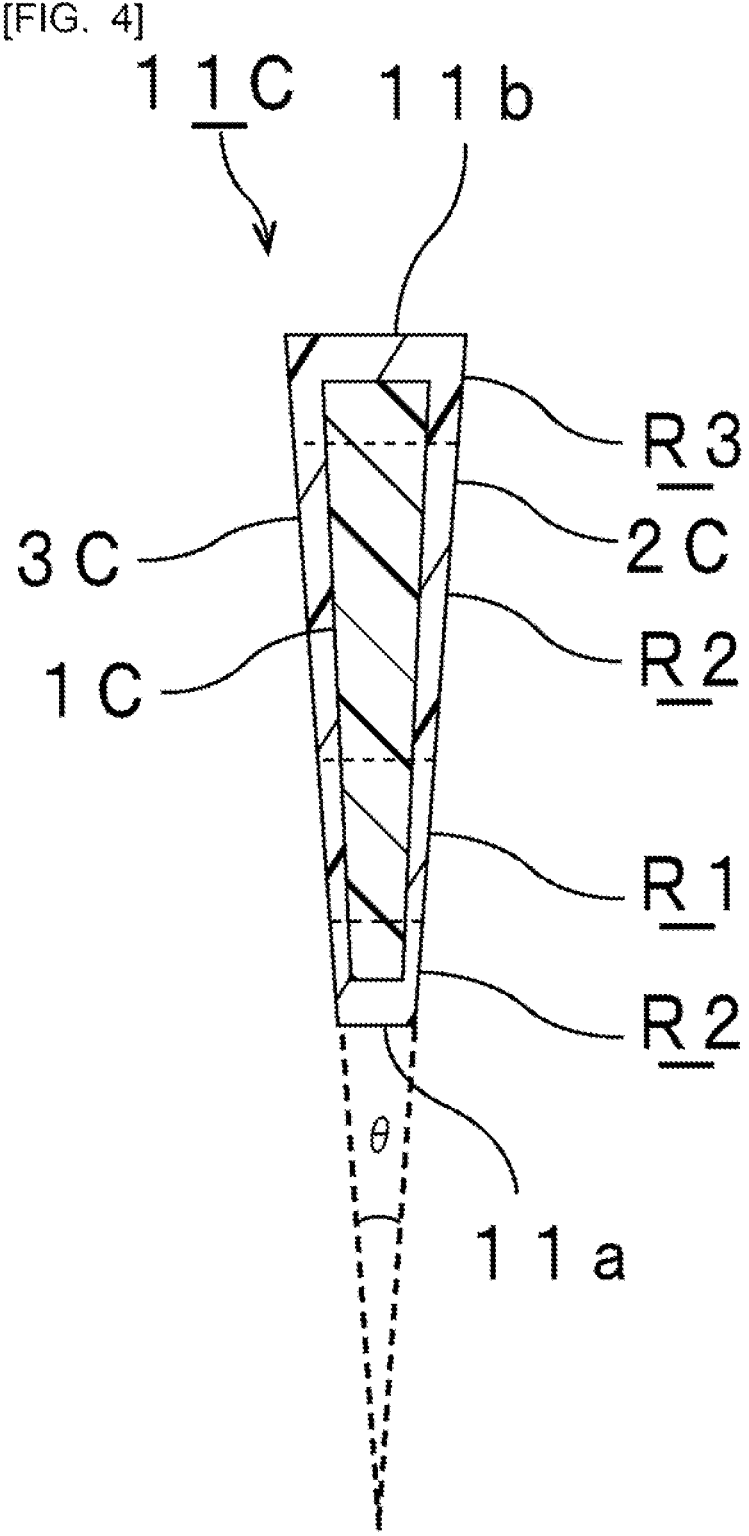
[FIG. 4]

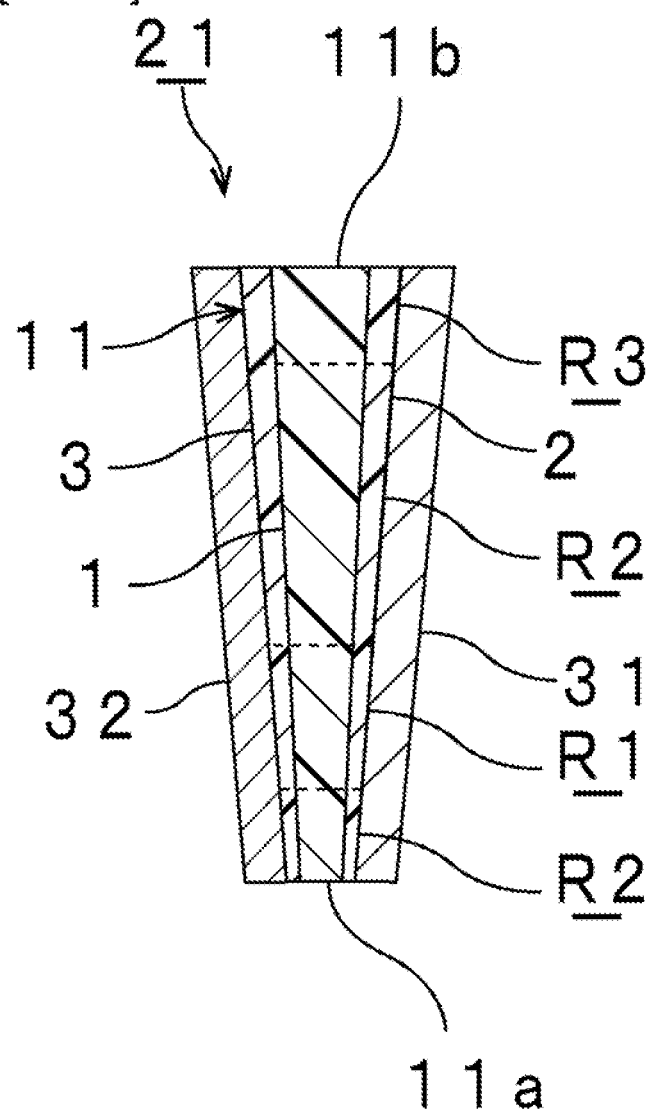
[FIG. 5]

[FIG. 6]
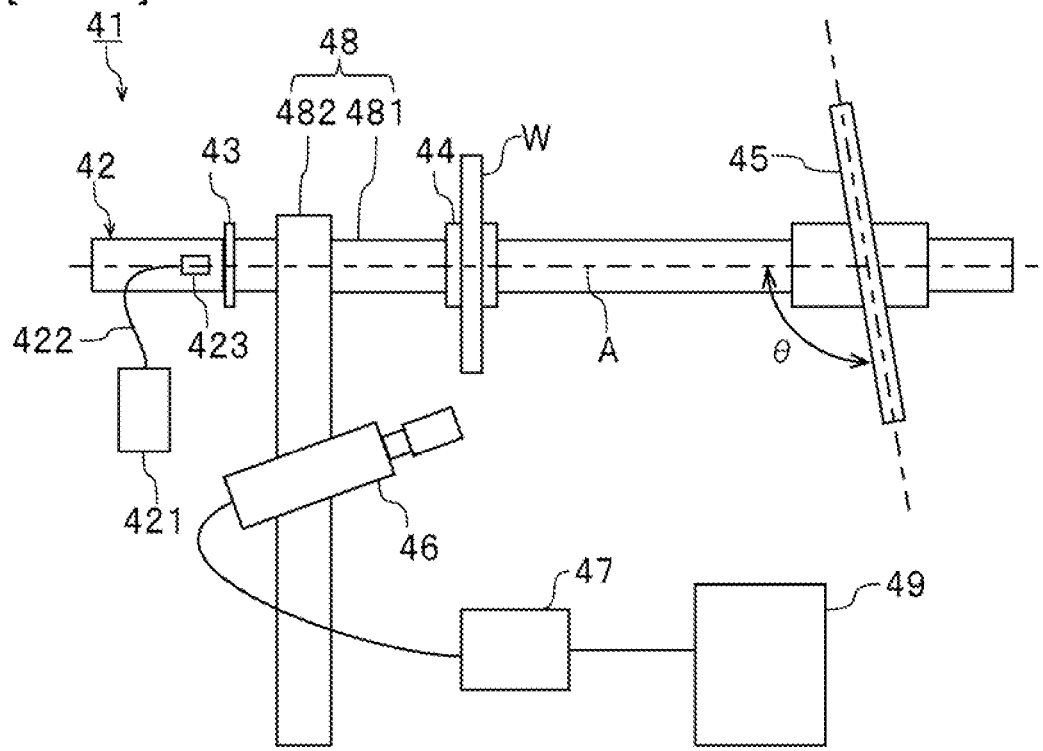
[FIG. 7]
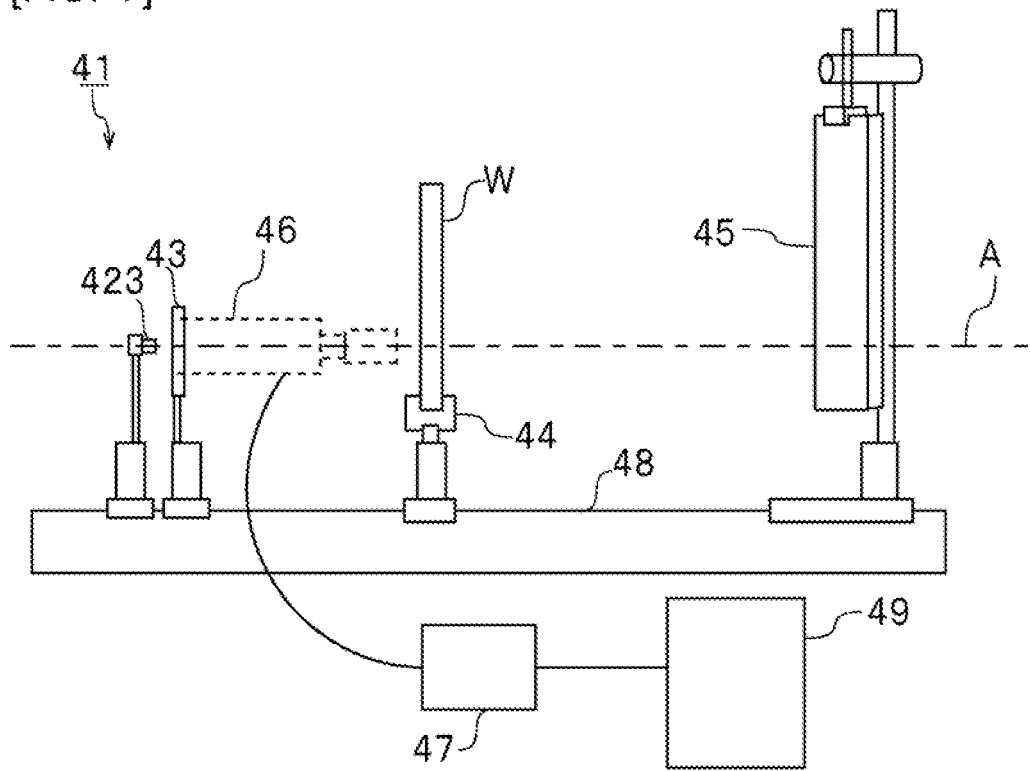

[FIG. 8]
(a)
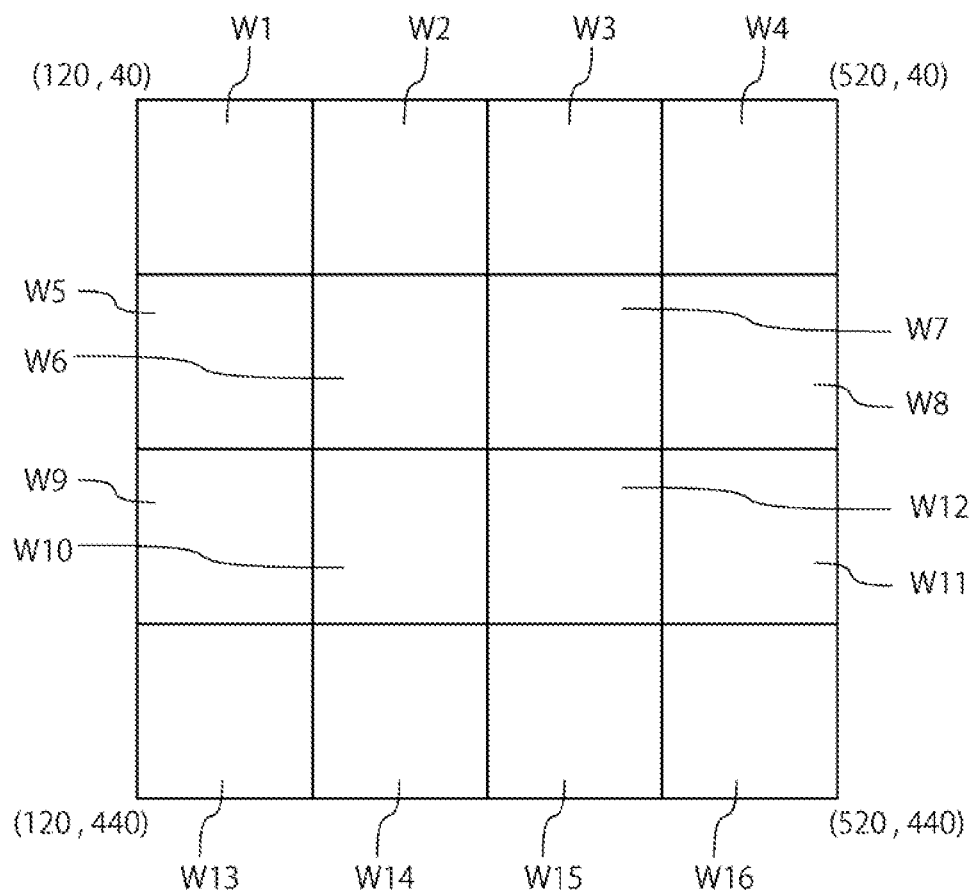
(b)
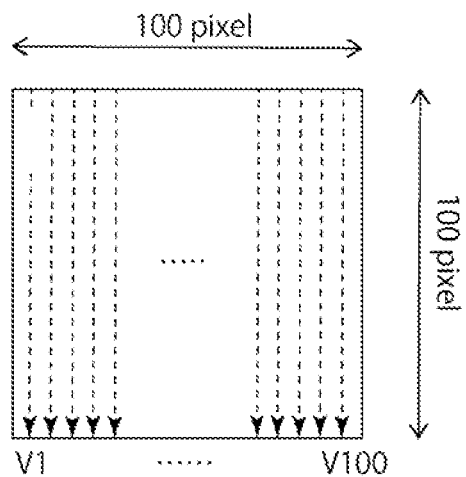

LAMINATED GLASS INTERLAYER FILM AND LAMINATED GLASS

TECHNICAL FIELD

The present invention relates to an interlayer film for laminated glass that is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, laminated glass is widely used for automobiles, railway vehicles, aircraft, ships, buildings and the like. Laminated glass is produced by sandwiching an interlayer film between a pair of glass plates.

Moreover, as a laminated glass used in automobiles, a head-up display (HUD) has been known. In a HUD, it is possible to display measured information including automobile traveling data such as speed on the windshield of the automobile, and the driver can recognize as if the display were shown in front of the windshield.

As one example of the laminated glass, Patent Document 1 described below discloses a laminated glass for vehicles in which two curved glass plates and a multilayer resin interlayer film are laminated. The resin interlayer film is disposed between the glass plates. In the laminated glass for vehicles, the resin interlayer film has a wedge-like section shape in which the thickness of the upper side is larger than the thickness of the lower side when the laminated glass is attached to a vehicle, and the resin interlayer film is a multilayer film including at least a first resin layer and a second resin layer having a hardness smaller than a hardness of the first resin layer. In the laminated glass for vehicles, the thickness of the first resin layer is 0.3 mm or more in a region of 400 mm or less from the lower side.

RELATED ART DOCUMENT

Patent Document

Patent Document 1: JP 2007-223883 A

SUMMARY OF THE INVENTION

Problems to be Solved by the Invention

In the conventional interlayer film as described in Patent Document 1, the thickness of the layer that contributes to improvement in the sound insulating property is relatively small. Therefore, in the conventional interlayer film, it is sometimes the case that the sound insulating property of the laminated glass cannot be enhanced sufficiently.

An object of the present invention is to provide an interlayer film for laminated glass capable of enhancing the sound insulating property of the laminated glass. It is also an object of the present invention to provide a laminated glass prepared with the interlayer film for laminated glass.

Means for Solving the Problems

According to a broad aspect of the present invention, there is provided an interlayer film for laminated glass (in the present specification, "interlayer film for laminated glass" is sometimes abbreviated as "interlayer film"), the interlayer film having a two or more-layer structure, the interlayer film including one end and the other end being on an opposite side of the one end and having a thickness larger than a thickness of the one end, at least one layer having a glass transition temperature of less than 15° C., and a region where a value of Y/X is 0.12 or more when the interlayer film has a thickness of X μm and a total thickness of the at least one layer having a glass transition temperature of less than 15° C. is denoted by Y μm, the interlayer film having an average thickness of each surface layer in a region, the region from a position of 100 mm to a position of 400 mm from the one end toward the other end, of less than 300 μm.

According to a broad aspect of the present invention, there is provided an interlayer film for laminated glass (in the present specification, "interlayer film for laminated glass" is sometimes abbreviated as "interlayer film") for use in a laminated glass that is a head-up display, the interlayer film having a two or more-layer structure, the interlayer film including a region for display corresponding to a display region of the head-up display, one end and the other end being on an opposite side of the one end and having a thickness larger than a thickness of the one end, at least one layer having a glass transition temperature of less than 15° C., and a region where a value of Y/X is 0.12 or more when the interlayer film has a thickness of X μm and a total thickness of the at least one layer having a glass transition temperature of less than 15° C. is denoted by Y μm, the interlayer film having an average thickness of each surface layer in the region for display of less than 300 μm.

In a specific aspect of the interlayer film according to the present invention, when the interlayer film is arranged between clear glasses having a thickness of 2.5 mm conforming to JIS R3202:1996 to obtain a laminated glass X having a size of 30 cm long and 30 cm wide, and the laminated glass X obtained is subjected to the following penetration resistance test, the steel ball fails to penetrate.

Penetration resistance test: The laminated glass X is stored in an environment of 23±2° C. for 4 hours or more so that the surface temperature of the laminated glass X is 23° C. For one laminated glass X after the storing, a steel ball having a weight of 2260±20 g and a diameter of 82 mm is dropped to a center part of a principal plane of the laminated glass X from a height of 6.5 nm in accordance with JIS B3212:2015. It is judged that the steel ball fails to penetrate when the steel ball fails to penetrate the laminated glass X in 5 seconds after colliding with the laminated glass X.

In a specific aspect of the interlayer film according to the present invention, when the interlayer film is arranged between clear glasses having a thickness of 2.5 mm conforming to JIS R3202:1996 to obtain a laminated glass Y having a size of 15 cm long and 30 cm wide, and the laminated glass Y obtained is subjected to the following measurement of optical strain, an optical strain value of the laminated glass Y is 2.0 or less.

Measurement of optical strain: An optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image is prepared. As the measuring object, two measuring objects, namely, the laminated glass Y, and a laminated glass for calibration obtained by arranging a monolayer interlayer film for calibration having a visible light transmittance of 88% between two sheets of clear float glass having a thickness of 2.5 mm are prepared. The laminated glass Y and the laminated glass for calibration are stored in an environment of 23±2° C. for 4 hours or more so that the surface temperature of the laminated glass Y and the laminated glass for calibration is 23° C. An optical strain value of the laminated glass Y is measured by using the optical strain inspection apparatus that is adjusted so that an optical strain value in a condition that no measuring object is placed is 1.30 and an optical strain value of the laminated glass for calibration is 1.14 when the following processing operation in the image processing part is executed.

Processing operation in image processing part: Each pixel of the gray image is converted to a pixel value of 0 to 255 according to the shading of the gray image. A region of 400 pixels×400 pixels formed by connecting four points of pixel coordinates (120, 40), (520, 40), (120, 440), and (520, 440) of the gray image is divided into 16 windows in total each containing 100 pixels×100 pixels. In each of the 16 windows, a "variance of pixel values" is calculated for 100 pixels in each of a first column to a one hundredth column of pixel coordinates. An average "variance of pixel values" is determined, as an "optical strain of a window", from the "variance of pixel values" calculated in each of the first column to the one hundredth column. An average "optical strain of a window" is determined, as an "optical strain of a measuring object", from the "optical strain of a window" determined in each of the 16 windows.

In a specific aspect of the interlayer film according to the present invention, the interlayer film has protrusions and recesses formed by a melt fracture method on the surface.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided a laminated glass including one end and the other end being on an opposite side of the one end and having a thickness larger than a thickness of the one end, a first lamination glass member, a second lamination glass member, and an interlayer film for laminated glass, the interlayer film arranged between the first lamination glass member and the second lamination glass member, the interlayer film having a two or more-layer structure, the interlayer film including at least one layer having a glass transition temperature of less than 15° C., the interlayer film having a region where a value of Y/X is 0.12 or more when the interlayer film has a thickness of X μm and a total thickness of the at least one layer having a glass transition temperature of less than 15° C. is denoted by Y μm, the interlayer film having an average thickness of each surface layer in a region, the region from a position of 100 mm to a position of 400 mm from the one end toward the other end, of less than 300 μm.

According to a broad aspect of the present invention, there is provided a laminated glass that is a head-up display, the laminated glass including one end and the other end being on an opposite side of the one end and having a thickness larger than a thickness of the one end, a display region of the head-up display, a first lamination glass member, a second lamination glass member, and an interlayer film for laminated glass, the interlayer film arranged between the first lamination glass member and the second lamination glass member, the interlayer film having a two or more-layer structure, the interlayer film including at least one layer having a glass transition temperature of less than 15° C., the interlayer film having a region where a value of Y/X is 0.12 or more when the interlayer film has a thickness of X μm and a total thickness of the at least one layer having a glass transition temperature of less than 15° C. is denoted by Y μm, the interlayer film having an average thickness of each surface layer in the display region of less than 300 μm.

In a specific aspect of the laminated glass according to the present invention, the steel ball fails to penetrate in the following penetration resistance test.

Penetration resistance test: The laminated glass is stored in an environment of 23±2° C. for 4 hours or more so that the surface temperature of the laminated glass is 23° C. For one laminated glass after the storing, a steel ball having a weight of 2260±20 g and a diameter of 82 mm is dropped to a center part of a principal plane of the laminated glass from a height of 6.5 m in accordance with JIS R3212:2015. It is judged that the steel ball fails to penetrate when the steel ball fails to penetrate the laminated glass in 5 seconds after colliding with the laminated glass.

In a specific aspect of the laminated glass according to the present invention, when the measurement of optical strain is conducted, an optical strain value of the laminated glass is 2.0 or less.

Measurement of optical strain: An optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image is prepared. As the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm are prepared. The laminated glass and the laminated glass for calibration are stored in an environment of 23±2° C. for 4 hours or more so that the surface temperature of the laminated glass and the laminated glass for calibration is 23° C. An optical strain value of the laminated glass is measured by using the optical strain inspection apparatus that is adjusted so that an optical strain value in a condition that no measuring object is placed is 1.30 and an optical strain value of the laminated glass for calibration is 1.14 when the following processing operation in the image processing part is executed.

Processing operation in image processing part: Each pixel of the gray image is converted to a numerical value of 0 to 255 according to the shading of the gray image. A region of 400 pixels×400 pixels formed by connecting four points of pixel coordinates (120, 40), (520, 40), (120, 440), and (520, 440) of the gray image is divided into 16 windows in total each containing 100 pixels×100 pixels. In each of the 16 windows, a "variance of pixel values" is calculated for 100 pixels in each of a first column to a one hundredth column of pixel coordinates. An average "variance of pixel values" is determined, as an "optical strain of a window", from the "variance of pixel values" calculated in each of the first column to the one hundredth column. An average "optical strain of a window" is determined, as an "optical strain of a measuring object", from the "optical strain of a window" determined in each of the 16 windows.

Effect of the Invention

The interlayer film according to the present invention is an interlayer film having a two or more-layer structure, and has one end and the other end being on an opposite side of the one end, and the other end has a thickness larger than a thickness of the one end. The interlayer film according to the present invention includes at least one layer having a glass transition temperature of less than 15° C., and has a region where a value of Y/X is 0.12 or more when the interlayer film has a thickness of X μm and a total thickness of the at least one layer having a glass transition temperature of less than 15° C. is denoted by Y μm. In the interlayer film according to the present invention, an average thickness of each surface layer in a region from a position of 100 mm to a position of 400 mm from the one end toward the other end is less than 300 μm. In the interlayer film according to the present invention, since the above configuration is provided, it is possible to enhance the sound insulating property of the laminated glass.

The interlayer film according to the present invention is an interlayer film for use in a laminated glass that is a head-up display, and is an interlayer film having a two or more-layer structure, and has a region for display corresponding to a display region of the head-up display, and has one end and the other end being on an opposite side of the one end, and the thickness of the other end is larger than the thickness of the one end. The interlayer film according to the present invention includes at least one layer having a glass transition temperature of less than 15° C., and has a region where a value of Y/X is 0.12 or more when the interlayer film has a thickness of X μm and a total thickness of the at least one layer having a glass transition temperature of less than 15° C. is denoted by Y μm. In the interlayer film according to the present invention, an average thickness of each surface layer in the region for display is less than 300 μm. In the interlayer film according to the present invention, since the above configuration is provided, it is possible to enhance the sound insulating property of the laminated glass.

The laminated glass according to the present invention has one end and the other end being on an opposite side of the one end, the other end has a thickness larger than a thickness of the one end, the laminated glass includes a first lamination glass member, a second lamination glass member, and an interlayer film arranged between the first lamination glass member and the second lamination glass member, and the interlayer film has a two or more-layer structure. In the laminated glass according to the present invention, the interlayer film includes at least one layer having a glass transition temperature of less than 15° C., and has a region where a value of Y/X is 0.12 or more when the interlayer film has a thickness of X μm and a total thickness of the at least one layer having a glass transition temperature of less than 15° C. is denoted by Y μm. In the laminated glass according to the present invention, an average thickness of each surface layer of the interlayer film in a region from a position of 100 mm to a position of 400 mm from the one end toward the other end is less than 300 μm. Since the laminated glass according to the present invention is provided with the above-mentioned configuration, the sound insulating property can be enhanced.

The laminated glass according to the present invention is a laminated glass that is a head-up display, and has one end and the other end being on an opposite side of the one end, the other end has a thickness larger than a thickness of the one end, and the laminated glass has a display region of the head-up display. The laminated glass according to the present invention includes a first lamination glass member, a second lamination glass member, and an interlayer film arranged between the first lamination glass member and the second lamination glass member, and the interlayer film has a two or more-layer structure. In the laminated glass according to the present invention, the interlayer film includes at least one layer having a glass transition temperature of less than 15° C., and has a region where a value of Y/X is 0.12 or more when the interlayer film has a thickness of X μm and a total thickness of the at least one layer having a glass transition temperature of less than 15° C. is denoted by Y μm. In the laminated glass according to the present invention, an average thickness of each surface layer of the interlayer film in the region for display is less than 300 μm. Since the laminated glass according to the present invention is provided with the above-mentioned configuration, the sound insulating property can be enhanced.

BRIEF DESCRIPTION OF DRAWINGS

FIGS. 1(a) and (b) are a sectional view and a front view, respectively, schematically showing an interlayer film for laminated glass, in accordance with a first embodiment of the present invention.

FIG. 2 is a sectional view schematically showing an interlayer film for laminated glass in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an example of laminated glass prepared with the interlayer film for laminated glass shown in FIG. 1.

FIG. 6 is a plan view schematically showing an optical strain inspection apparatus for use in measurement of optical strain.

FIG. 7 is a front view schematically showing an optical strain inspection apparatus for use in measurement of optical strain.

FIGS. 8(a) and (b) are views for illustrating a processing operation in an image processing part.

MODES FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The interlayer film has a two or more-layer structure. The interlayer film may have a two-layer structure, may have a three-layer structure, may have a three or more-layer structure, may have a four or more-layer structure, may have a five or more-layer structure, and may have a six or more-layer structure. The interlayer film may have these structures in part of the interlayer film or in the entire interlayer film. The structure of the interlayer film may partially vary.

The interlayer film has one end and the other end being on an opposite side of the one end. The one end and the other end are end parts of both sides facing each other in the interlayer film. In the interlayer film, the thickness of the other end is larger than the thickness of the one end.

The interlayer film is used, for example, in a laminated glass that is a head-up display. When the interlayer film is used in a laminated glass that is a head-up display, and the interlayer film has a region for display corresponding to a display region of the head-up display. The region for display is a region capable of favorably displaying information.

The interlayer film includes at least one layer having a glass transition temperature of less than 15° C.

When the interlayer film has a thickness of X μm and a total thickness of the at least one layer having a glass transition temperature of less than 15° C. is denoted by Y μm, the interlayer film has a region where a value of Y/X is 0.12 or more.

In the interlayer film, an average thickness of each surface layer in the region from the position of 100 mm to the position of 400 mm from the one end toward the other end is less than 300 μm, or an average thickness of each surface layer in the region for display is less than 300 μm.

In the interlayer film according to the present invention, since the above configuration is provided, it is possible to enhance the sound insulating property of the laminated glass. The layer having a glass transition temperature of less than 15° C. is a layer capable of effectively enhancing the sound insulating property. The interlayer film according to the present invention has a region where the thickness of the layer having a glass transition temperature of less than 15° C. is relatively large. Therefore, it is possible to enhance the sound insulating property of the laminated glass.

Also, in the interlayer film according to the present invention, it is possible to enhance the penetration resistance of the laminated glass, and further it is possible to suppress the optical strain of the laminated glass. When the thickness of the layer that contributes to enhancement in the sound insulating property is merely increased so as to enhance the sound insulating property of the laminated glass, it is necessary to reduce the thickness of the surface layer or the like, so that deterioration in penetration resistance and generation of an optical strain are easy to occur in the laminated glass. Since the present invention is provided with the above-mentioned configuration, the sound insulating property can be enhanced, the penetration resistance can be enhanced, and the optical strain can be suppressed.

The interlayer film includes at least one layer having a glass transition temperature of less than 15° C. The interlayer film may include only one layer having a glass transition temperature of less than 15° C., or may include two layers having a glass transition temperature of less than 15° C., or may include two or more layers having a glass transition temperature of less than 15° C., or may include three layers having a glass transition temperature of less than 15° C., or may include three or more layers having a glass transition temperature of less than 15° C.

It is preferred that the interlayer film include the layer having a glass transition temperature of less than 15° C. and a layer having a glass transition temperature of 15° C. or more. It is preferred that the interlayer film include at least one layer having a glass transition temperature of 15° C. or more. The interlayer film may include only one layer having a glass transition temperature of 15° C. or more, or may include two layers having a glass transition temperature of 15° C. or more, or may include two or more layers having a glass transition temperature of 15° C. or more, or may include three layers having a glass transition temperature of 15° C. or more, or may include three or more layers having a glass transition temperature of 15° C. or more.

The glass transition temperature of the layer having a glass transition temperature of less than 15° C. is preferably −4° C. or more, more preferably 0° C. or more, and is preferably 12° C. or less, more preferably 8° C. or less. When the glass transition temperature is the above lower limit or more and the above upper limit or less, it is possible to further enhance the sound insulating property of the laminated glass.

The glass transition temperature of the layer having a glass transition temperature of 15° C. or more is preferably 20° C. or more, more preferably 25° C. or more, further preferably 30° C. or more, and is preferably 50° C. or less, more preferably 45° C. or less, further preferably 40° or less. When the glass transition temperature is the above lower limit or more and the above upper limit or less, it is possible to further enhance the sound insulating property of the laminated glass.

An absolute value of difference between the glass transition temperature of the layer having a glass transition temperature of less than 15° C. and the glass transition temperature of the layer having a glass transition temperature of 15° C. or more is preferably 8° C. or more, more preferably 16° C. or more, and is preferably 40° C. or less, more preferably 32° C. or less. When the absolute value of difference is the above lower limit or more and the above upper limit or less, it is possible to further enhance the sound insulating property of the laminated glass.

The glass transition temperature is determined by measurement of viscoelasticity. The viscoelasticity measurement is conducted specifically in the following manner.

The test piece is stored for 12 hours in an environment of a room temperature of 23±2° C. and a humidity of 25±5%. Then, viscoelasticity is measured using a viscoelasticity measuring device "ARES-G2" available from TA Instruments. A parallel plate with a diameter of 8 mm is used as a jig, and the measurement is performed in a shearing mode under the condition in which the temperature is decreased from 100° C. to −20° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.).

The viscoelasticity measurement may be conducted using an interlayer film itself. In this case, a peak of tan δ and the like originated in each layer may be read from the measurement result. Layers of the interlayer film may be delaminated from each other, and the glass transition temperature of the layer to be measured may be measured. In the case of a laminated glass, after cooling the laminated glass with liquid nitrogen or the like, the lamination glass member and the interlayer film are delaminated, and the viscoelasticity measurement may be conducted using the delaminated interlayer film.

A thickness of the interlayer film is denoted by X μm, and a total thickness of the at least one layer having a glass transition temperature of less than 15° C. is denoted by Y μm. X is a thickness of the interlayer film at a predetermined position, and Y is a total thickness of the at least one layer having a glass transition temperature of less than 15° C. at the same predetermined position. When the interlayer film has only one layer having a glass transition temperature of less than 15° C., Y means the thickness of the layer. When the interlayer film has two or more layers having a glass transition temperature of less than 15° C., Y means the total thickness of the layers.

The interlayer film has a region where a value of Y/X is 0.12 or more (hereinafter, sometimes described as a region A). That is, the interlayer film has a region (region A) where a ratio of the total thickness (Y) of the at least one layer having a glass transition temperature of less than 15° C. to the thickness (X) of the interlayer film is 0.12 or more.

In the region A, the value of Y/X is preferably 0.14 or more, and is preferably 0.18 or less, more preferably 0.16 or less. When the value of Y/X is the above lower limit or more, it is possible to further enhance the sound insulating property of the laminated glass. When the value of Y/X is the above upper limit or less, it is possible to further enhance the penetration resistance of the laminated glass, and it is possible to effectively suppress the optical strain.

It is preferred that the region A exist from the position of 0 mm to the position of 400 mm from the one end toward the other end, and it is more preferred that the region A exist from the position of 0 mm to the position of 200 mm from the one end toward the other end (in this case, the region A may exist at other location). In this case, it is possible to further enhance the sound insulating property and the penetration resistance of the laminated glass, and it is possible to effectively suppress the optical strain.

A distance between one end and the other end of the interlayer film is denoted by L. It is preferred that the region A exist from the position of 0L to the position of 1.0L from the one end toward the other end. It is preferred that the region A exist from the position of 0L to the position of 0.4L from the one end toward the other end, and it is more preferred that the region A exist from the position of 0L to the position of 0.2L from the one end toward the other end (in this case, the region A may exist at other location). It is most preferred that the region A exist from the position of 0L to the position of 0.1L from the one end toward the other end. In this case, it is possible to further enhance the sound insulating property and the penetration resistance of the laminated glass, and it is possible to effectively suppress the optical strain.

Since the interlayer film has a two or more-layer structure, the interlayer film has two surface layers (first surface layer and second surface layer).

In the interlayer film, an average thickness of each surface layer in a region from the position of 100 mm to the position of 400 mm from the one end toward the other end (hereinafter, sometimes described as a region B) is less than 300 μm, or an average thickness of each surface layer in the region for display is less than 300 μm. When the average thickness of the surface layer in the region B or in the region for display is 300 μm or more, the sound insulating property sometimes deteriorates. The value of the average thickness of the surface layer is satisfied preferably in at least one of the first surface layer and the second surface layer, and more preferably in both of the first surface layer and the second surface layer. Each preferred form regarding the surface layer described in the present specification is satisfied in at least one of the first surface layer and the second surface layer, and preferably in both of the first surface layer and the second surface layer.

The average thickness of each surface layer in the region B or in the region for display is preferably 150 μm or more, more preferably 110 μm or more, and is preferably 290 μm or less, more preferably 270 μm or less. When the average thickness of the surface layer is the above lower limit or more and the above upper limit or less, it is possible to further enhance the sound insulating property and the penetration resistance of the laminated glass, and it is possible to effectively suppress the optical strain.

The interlayer film may include the layer having a glass transition temperature of less than 15° C., and may include the layer having a glass transition temperature of 15° C. or more as the surface layer. The interlayer film may include the layer having a glass transition temperature of less than 15° C. as the first surface layer, and may include the layer having a glass transition temperature of 15° C. or more as the second surface layer.

It is preferred that the surface layer be a layer having a glass transition temperature of 15° C. or more. In this case, it is possible to further enhance the sound insulating property and the penetration resistance of the laminated glass, and it is possible to effectively suppress the optical strain.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm or less, further preferably 1.5 mm or less.

A distance between one end and the other end of the interlayer film is denoted by L. It is preferred that the interlayer film have a minimum thickness in a region from the position of 0L to the position of 0.2L from the one end toward the other end, and have a maximum thickness in a region from the position of 0L to the position of 0.2L from the other end toward the one end. It is more preferred that the interlayer film have a minimum thickness in a region from the position of 0L to the position of 0.1L from the one end toward the other end, and have a maximum thickness in a region from the position of 0L to the position of 0.1L from the other end toward the one end. It is preferred that the interlayer film have a minimum thickness at the one end and have a maximum thickness at the other end.

The interlayer film may have a uniform-thickness part. The uniform-thickness part means that the variation in thickness does not exceed 10 μm per a distance range of 10 cm in the direction connecting the one end and the other end of the interlayer film. Therefore, the uniform-thickness part refers to the part where the variation in thickness does not exceed 10 μm per a distance range of 10 cm in the direction connecting the one end and the other end of the interlayer film. To be more specific, the uniform-thickness part refers to the part where the thickness does not vary at all in the direction connecting the one end and the other end of the interlayer film, or the thickness varies by 10 μm or less per a distance range of 10 cm in the direction connecting the one end and the other end of the interlayer film.

From the viewpoint of the practical aspect and the viewpoint of sufficiently enhancing the adhesive force and the penetration resistance, the maximum thickness of a surface layer in the interlayer film is preferably 200 μm or more, more preferably 250 μm or more, and is preferably 400 μm or less, more preferably 350 μm or less.

From the viewpoint of the practical aspect and the viewpoint of sufficiently enhancing the penetration resistance, the maximum thickness of the layer (intermediate layer) arranged between two surface layers in the interlayer film is preferably 550 μm or more, more preferably 600 μm or more, and is preferably 900 μm or less, more preferably 850 μm or less.

The distance L between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

From the viewpoint of better display, it is preferred that the interlayer film have a portion with a wedge-like sectional shape in the thickness direction. It is preferred that the sectional shape in the thickness direction of the region for display be a wedge-like shape.

In order to suppress double images, the wedge angle θ of the interlayer film can be appropriately set according to the fitting angle of the laminated glass. The wedge angle θ is a wedge angle of the interlayer film as a whole.

The wedge angle θ of the interlayer film is an interior angle formed at the intersection point between a straight line connecting surface parts on the one side of the interlayer film (first surface part) of the maximum thickness part and the minimum thickness part in the interlayer film, and a straight line connecting surface parts of the other side of the interlayer film (second surface part) of the maximum thickness part and the minimum thickness part in the interlayer film.

When there are a plurality of maximum thickness parts, there are a plurality of minimum thickness parts, the maximum thickness part is located in a certain region, or the minimum thickness part is located in a certain region, the maximum thickness part and the minimum thickness part for determining the wedge angle θ are selected so that the wedge angle θ to be determined is the maximum.

From the viewpoint of suppressing double images more effectively, the wedge angle θ of the interlayer film is preferably 0.05 mrad or more, more preferably 0.1 mrad (0.00575 degrees) or more, further preferably 0.2 mrad (0.0115 degrees) or more. When the wedge angle θ is the above lower limit or more, it is possible to obtain laminated glass suited for cars such as a truck or a bus in which the attachment angle of the windshield is large.

From the viewpoint of suppressing double images more effectively, the wedge angle θ of the interlayer film is preferably 2 mrad (0.1146 degrees) or less, and more preferably 0.7 mrad (0.0401 degrees) or less. When the wedge angle θ is the above upper limit or less, it is possible to obtain laminated glass suited for cars such as a sports car in which the attachment angle of the windshield is small.

As a measuring device for use for measurement of a wedge angle (θ) of the interlayer film, and a thickness of the interlayer film, a contact type thickness meter "TOF-4R" (available from Yamabun Electronics Co., Ltd.) or the like can be recited.

Measurement of the thickness is conducted such that the distance is the shortest from the one end toward the other end by using the above-described measuring device at a film conveyance speed of 2.15 mm/minute to 2.25 mm/minute.

Examples of the measuring device for use in measurement of thickness of each layer of the interlayer film include "SE-3000" (available from SELMIC Corporation) and the like.

Thickness of each layer of the interlayer film can be measured in the following manner. The interlayer film is cut at a measuring position in the thickness direction with a razor, a cutter, or the like. After observing the cut plane of the interlayer film with the aforementioned measuring device, thickness of each layer is measured by means of calculation software in the attached software.

As a measuring device for use for measurement of a wedge angle (θ) of the interlayer film, a thickness of the interlayer film, and a thickness of each layer of the interlayer film after the interlayer film is made into laminated glass, a non-contact type multilayer film thickness measuring device "OPTIGAUGE" (available from Lumetrics, Inc.) or the like can be recited. When the measuring device is used, it is possible to measure the thickness of the interlayer film while the interlayer film is in the laminated glass.

The interlayer film is suitably used for laminated glass serving as a head-up display (HUD). It is preferred that the interlayer film be an interlayer film for HUD. It is preferred that the interlayer film have a region for display corresponding to a display region of HUD.

From the viewpoint of suppressing double images more effectively, it is preferred that the interlayer film have the region for display in a region between a position of 6 cm from the one end toward the other end of the interlayer film and a position of 63.8 cm from the one end toward the other end.

From the viewpoint of suppressing double images more effectively, it is more preferred that the interlayer film have the region for display in a region between a position of 8 cm from the one end toward the other end of the interlayer film and a position of 61.8 cm from the one end toward the other end.

From the viewpoint of suppressing double images more effectively, it is still more preferred that the interlayer film have the region for display in a region between a position of 9 cm from the one end toward the other end of the interlayer film and a position of 60.8 cm from the one end toward the other end.

From the viewpoint of suppressing double images more effectively, it is further preferred that the interlayer film have the region for display in a region between a position of 9.5 cm from the one end toward the other end of the interlayer film and a position of 60.3 cm from the one end toward the other end.

From the viewpoint of suppressing double images more effectively, it is especially preferred that the interlayer film have the region for display in a region between a position of 10 cm from the one end toward the other end of the interlayer film and a position of 59.8 cm from the one end toward the other end.

The region for display may exist in a part or the whole of the region up to the aforementioned position (for example, 63.8 mm) from the one end toward the other end of the interlayer film. The region for display may exist in a size of about 30 cm in the direction connecting the one end and the other end.

From the viewpoint of suppressing double images effectively, it is preferred that the interlayer film have a portion with a sectional shape in the thickness direction of a wedge-like shape in the region between a position of 6 cm from the one end toward the other end of the interlayer film and a position of 63.8 cm from the one end toward the other end.

From the viewpoint of suppressing double images effectively, it is more preferred that the interlayer film have a portion with a sectional shape in the thickness direction of a wedge-like shape in the region between a position of 8 cm from the one end toward the other end of the interlayer film and a position of 61.8 cm from the one end toward the other end.

From the viewpoint of suppressing double images effectively, it is still more preferred that the interlayer film have a portion with a sectional shape in the thickness direction of a wedge-like shape in the region between a position of 9 cm from the one end toward the other end of the interlayer film and a position of 60.8 cm from the one end toward the other end.

From the viewpoint of suppressing double images effectively, it is further preferred that the interlayer film have a portion with a sectional shape in the thickness direction of a wedge-like shape in the region between a position of 9.5 cm from the one end toward the other end of the interlayer film and a position of 60.3 cm from the one end toward the other end.

From the viewpoint of suppressing double images effectively, it is especially preferred that the interlayer film have a portion with a sectional shape in the thickness direction of a wedge-like shape in the region between a position of 10 cm from the one end toward the other end of the interlayer film and a position of 59.8 cm from the one end toward the other end.

The portion with a sectional shape in the thickness direction of a wedge-like shape may exist in a part or the whole of the region up to the aforementioned position (for example, 63.8 mm) from the one end toward the other end. The portion with a sectional shape in the thickness direction of a wedge-like shape may exist in a size of about 30 cm in the direction connecting the one end and the other end.

The interlayer film may have a shading region. The shading region may be separate from the region for display. The shading region is provided so as to prevent a driver from feeling glare while driving, for example, by sunlight or outdoor lighting. The shading region can be provided so as to impart the heat shielding property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film.

From the viewpoint of providing better display, and further broadening the field of view, the visible light transmittance of the region for display is preferably 80% or more, more preferably 88% or more, further preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 nm to 780 nm of the obtained laminated glass can be measured by using a spectrophotometer ("U-4100" available from Hitachi High-Tech Corporation) in conformity with JIS R3211:1998. As the glass plate, it is preferred to use clear glass having a thickness of 2 mm.

It is preferred that the region for display have a length direction and a width direction. For excellent versatility of the interlayer film, it is preferred that the width direction of the region for display be the direction connecting the one end and the other end. It is preferred that the region for display be belt-shaped.

It is preferred that the interlayer film have an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located at the opposite sides of the TD direction.

When the interlayer film is arranged between clear glasses having a thickness of 2.5 mm conforming to JIS R3202:1996 to obtain a laminated glass X having a size of 30 cm long and 30 cm wide, and the obtained laminated glass X is subjected to the following penetration resistance test, it is preferred that the steel ball fail to penetrate. In this case, it is possible to further enhance the penetration resistance of the laminated glass.

It is preferred that the laminated glass X be prepared in the following manner.

The interlayer film is sandwiched between two sheets of clear glass conforming to JIS R3202:1996 having a length of 30 cm, a width of 30 cm, and a thickness of 2.5 mm to obtain a laminate X. The obtained laminate X is put into a rubber bag, and the rubber bag is connected with a suction decompressor. The laminate X is preliminarily press-bonded together by heating such that the temperature of the laminate X is 70° C. while the laminate X is kept under a reduced pressure of 16 kPa for 10 minutes. After the pressure is recovered to the atmospheric pressure, the preliminarily press-bonded laminate X is press-bonded under conditions of 140° C. and a pressure of 1300 kPa for 10 minutes in an autoclave. After the press-bonding, the conditions are recovered to 50° C. and the atmospheric pressure to obtain a laminated glass X.

Penetration resistance test: The laminated glass X is stored in an environment of 23±2° C. for 4 hours or more so that the surface temperature of the laminated glass X is 23° C. For one laminated glass X after the storing, a steel ball having a weight of 2260±20 g and a diameter of 82 mm is dropped to a center part of a principal plane of the laminated glass X from a height of 6.5 m in accordance with JIS R3212:2015. It is judged that the steel ball fails to penetrate when the steel ball fails to penetrate the laminated glass X in 5 seconds after colliding with the laminated glass X.

When the interlayer film is arranged between clear glasses having a thickness of 2.5 mm conforming to JIS R3202:1996 to obtain a laminated glass Y having a size of 15 cm long and 30 cm wide, and the obtained laminated glass Y is subjected to the following measurement of optical strain, it is preferred that an optical strain value of the laminated glass Y be 2.0 or less. In this case, it is possible to further suppress the optical strain of the laminated glass.

From the viewpoint of further suppressing the generation of an optical strain, the optical strain value of the laminated glass Y is preferably 1.8 or less, more preferably 1.7 or less. It is preferred that the optical strain value be as small as possible.

It is preferred that the laminated glass Y be prepared in the following manner.

The interlayer film is sandwiched between two sheets of clear glass conforming to JIS R3202:1996 having a length of 15 cm, a width of 30 cm, and a thickness of 2.5 mm to obtain a laminate Y. The obtained laminate Y is put into a rubber bag, and the rubber bag is connected with a suction decompressor. The laminate Y is preliminarily press-bonded together by heating such that the temperature of the laminate Y is 70° C. while the laminate X is kept under a reduced pressure of 16 kPa for 10 minutes. After the pressure is recovered to the atmospheric pressure, the preliminarily press-bonded laminate Y is press-bonded under conditions of 140° C. and a pressure of 1300 kPa for 10 minutes in an autoclave. After the press-bonding, the conditions are recovered to 50° C. and the atmospheric pressure to obtain a laminated glass Y.

Measurement of optical strain: An optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image is prepared. As the measuring object, two measuring objects, namely, the laminated glass Y, and a laminated glass for calibration obtained by arranging a monolayer interlayer film for calibration having a visible light transmittance of 88% between two sheets of clear float glass having a thickness of 2.5 mm are prepared. The laminated glass Y and the laminated glass for calibration are stored in an environment of 23±2° C. for 4 hours or more so that the surface temperature of the laminated glass Y and the laminated glass for calibration is 23° C. An optical strain value of the laminated glass Y is measured by using the optical strain inspection apparatus that is adjusted so that an optical strain value in a condition that no measuring object is placed is 1.30 and an optical strain value of the laminated glass for calibration is 1.14 when the following processing operation in the image processing part is executed.

Processing operation in image processing part: Each pixel of the gray image is converted to a pixel value of 0 to 255 according to the shading of the gray image. A region of 400 pixels×400 pixels formed by connecting four points of pixel coordinates (120, 40), (520, 40), (120, 440), and (520, 440) of the gray image is divided into 16 windows in total each containing 100 pixels×100 pixels. In each of the 16 windows, a "variance of pixel values" is calculated for 100 pixels in each of a first column to a one hundredth column of pixel coordinates. An average "variance of pixel values" is determined, as an "optical strain of a window", from the "variance of pixel values" calculated in each of the first column to the one hundredth column. An average "optical strain of a window" is determined, as an "optical strain of a measuring object", from the "optical strain of a window" determined in each of the 16 windows.

FIG. 6 is a plan view schematically showing an optical strain inspection apparatus for use in measurement of optical strain. FIG. 2 is a front view schematically showing an optical strain inspection apparatus for use in measurement of optical strain. FIGS. 8(a) and (b) are views for illustrating a processing operation in an image processing part.

An optical strain inspection apparatus 41 is an apparatus for measuring an optical strain value of a measuring object W. The optical strain inspection apparatus 41 includes a light source unit 4, a slit part 43, a measuring object placing part 44, a projection plane 45, an image inputting part 46, an image processing part 47, a pedestal 48, and an evaluation part 49. In FIG. 6 and FIG. 7, the measuring object W is placed on the measuring object placing part 44.

The light source unit 42 includes a light emitting part 421, an optical fiber 422, and an irradiation port 423. The irradiation light emitted by the light emitting part 421 is released from the irradiation port 423 in the direction toward the slit part 43 through inside the optical fiber 422. Examples of the light emitting part include a halogen lamp, and the like. Examples of a commercial product of the halogen lamp include "EYE DICHRO-COOL HALOGEN (15 V 100 W)" available from IWASAKI ELECTRIC CO., LTD. and the like.

The slit part 43 has a slit in the center part. The irradiation light released from the light source unit 42 passes through the slit of the slit part 43 and reaches the measuring object W. Examples of the shape of the slit include a circular shape and a polygonal shape, and the like.

The irradiation light having penetrated the measuring object W is projected on the projection plane 45. The projection plane 45 can be installed while it is inclined at an angle θ relative to an optical axis A. Examples of the projection plane include white paper and the like. It is preferred that the surface of the projection plane be lusterless, and little contain unevenness.

The image inputting part 46 photographs the projection plane 45, and converts the contrast of the photographic image into a signal, and generates a gray image. Examples of the image inputting part include a CCD camera and the like. Examples of a commercial product of the CCD camera include "XC-ST70" available from Sony Corporation and the like.

The image processing part 47 detects an optical strain of the measuring object W according to a degree of variation in shading of the gray image. A variance of density values between pixels of the gray image is outputted.

The image processing part 47 converts each pixel of the gray image to a pixel value of 0 to 255 according to the shading of the gray image. As shown in FIG. 8(a), a region of 400 pixels×400 pixels formed by connecting four points of pixel coordinates (120, 40), (520, 40), (120, 440), (520, 440) is divided into 16 windows in total (Windows W1 to W16) each containing 100 pixels×100 pixels. The division into the 16 windows is performed so that they do not overlap with one another.

FIG. 8 (b) shows only one window in an enlarged scale. For 100 pixels in the same column of one window (broken arrow in FIG. 8(b)), a "variance of pixel values" is calculated. For each of the first column to the one hundredth column of the window, a "variance of pixel values" is calculated. In the first column of the window, variance of pixel values V1 is calculated. In the second column of the window, variance of pixel values V2 is calculated. Likewise, variances of pixel values V3 to V100 are calculated. One hundred values of "variance of pixel values" (variances V1 to V100) are obtained in one window. An average value of these 100 values of "variance of pixel values" is determined as an "optical strain of a window".

For each of the 16 windows, an "optical strain of a window" is calculated. An average "optical strain of a window" is determined, as an "optical strain of a measuring object", from the "optical strain of a window" determined in each of the 16 windows.

The evaluation part 49 compares the variance calculated by the image processing part 47, and a variance of a predetermined allowable range, and evaluates the optical strain of the measuring object W.

The pedestal 48 includes a pedestal body 481 and an arm 482. The image inputting part 46 is placed on the arm 482.

The irradiation port 423, the slit part 43, the measuring object placing part 44 and the projection plane 45 are movable on the pedestal 48 in the direction of the optical axis A.

The optical strain inspection apparatus 41 is one example of the optical strain inspection apparatus that can be used in the present invention. The optical strain inspection apparatus is described, for example, in JP H7-306152 A. As the optical strain inspection apparatus, a commercial product may be used.

In the present invention, as the measuring object W, two measuring objects, namely, the laminated glass Y and the laminated glass for calibration are used. The laminated glass for calibration is obtained by arranging a monolayer interlayer film for calibration having a visible light transmittance of 88% between two sheets of clear float glass having a thickness of 2.5 mm.

The visible light transmittance of the monolayer interlayer film for calibration is measured at a wavelength of 380 nm to 780 nm by using a spectrophotometer (for example, "U-4100" available from Hitachi High-Tech Corporation) in accordance with JIS R3211:1998.

It is preferred that the laminated glass for calibration be prepared with the monolayer interlayer film for calibration in the following manner.

The monolayer interlayer film for calibration is sandwiched between two sheets of clear glass conforming to JIS R3202:1996 having a length of 15 cm, a width of 30 cm, and a thickness of 2.5 mm to obtain a laminate. The obtained laminate is put into a rubber bag, and the rubber bag is connected with a suction decompressor. The laminate is preliminarily press-bonded together by heating such that the temperature of the laminate is 70° C. while the laminate is kept under a reduced pressure of 16 kPa for 10 minutes. After the pressure is recovered to the atmospheric pressure, the preliminarily press-bonded laminate is press-bonded under conditions of 140° C. and a pressure of 1300 kPa for 10 minutes in an autoclave. After the press-bonding, the conditions are recovered to 50° C. and the atmospheric pressure to obtain the laminated glass for calibration.

The positions of the irradiation port, the slit part, the measuring object placing part, the projection plane, and the image inputting part and the like, the shape and the size of the slit, the illuminance of the light source, the angle θ between the optical axis and the projection plane, and the like are adjusted so that the optical strain value in a condition that no measuring object is placed is 1.30 and the optical strain value of the laminated glass for calibration is 1.14. The condition that no measuring object is placed means the state that no object is placed on the measuring object placing part. An optical strain value of the laminated glass Y is measured by using the optical strain inspection apparatus that is adjusted so that an optical strain value in a condition that no measuring object is placed is 1.30 and an optical strain value of the laminated glass for calibration is 1.14.

Hereinafter, specific embodiments of the present invention will be described with reference to the drawings.

FIGS. 1(*a*) and (*b*) are a sectional view and a front view, respectively, schematically showing an interlayer film for laminated glass in accordance with a first embodiment of the present invention. FIG. 1(*a*) is a sectional view along the line I-I in FIG. 1(*b*). The size and dimension of the interlayer film in FIG. 1 and later described drawings are appropriately changed from the actual size and shape for convenience of illustration.

In FIG. 1(*a*), a section in the thickness direction of an interlayer film 11 is shown. In this connection, in FIG. 1(*a*) and later described drawings, for convenience of illustration, the thicknesses of an interlayer film and respective layers constituting the interlayer film and the wedge angle (θ) are shown so as to be different from actual thicknesses thereof and an actual wedge angle.

The interlayer film 11 includes a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multi-layered interlayer film having a three-layer structure.

The first layer 1 is a layer having a glass transition temperature of less than 15° C. Each of the second layer 2 and the third layer 3 is a layer having a glass transition temperature of 15° C. or more.

The interlayer film 11 has one end 11*a* and the other end 11*b* being on an opposite side of the one end 11*a*. The one end 11*a* and the other end 11*b* are end parts of both sides facing each other. The sectional shape in the thickness direction of each of the first layer 1, the second layer 2 and the third layer 3 is a wedge-like shape. The thicknesses of the first layer 1, the second layer 2, and the third layer 3 are larger in the other end 11*b* side than in the one end 11*a* side. Accordingly, the thickness of the other end 11*b* of the interlayer film 11 is larger than the thickness of the one end 11*a* thereof. The interlayer film 11 has a region being thin in thickness and a region being thick in thickness.

The interlayer film 11 has a region where the thickness increases from the one end 11*a* side to the other end 11*b* side. In the interlayer film 11, the increment of the thickness is constant from the one end 11*a* side to the other end 11*b* side in the region where the thickness increases.

The interlayer film 11 has a region for display R1 corresponding to a display region of a head-up display. The interlayer film 11 has a surrounding region R2 neighboring the region for display R1. The interlayer film 11 has a shading region R3 that is separate from the region for display R1. The shading region R3 is located in an edge portion of the interlayer film 11.

The interlayer film has the shape shown in FIG. 1(*a*), and may have a two-layer structure or four or more-layer structure. The interlayer film has the shape shown in FIG. 1(*a*), and may lack a region for display and may lack a shading region. Also, the interlayer film has the shape shown in FIG. 1(*a*) in which the sectional shape in the thickness direction of the first layer may be rectangular, the sectional shape in the thickness direction of the second layer may be rectangular, and the sectional shape in the thickness direction of the third layer may be rectangular.

FIG. 2 is a sectional view schematically showing an interlayer film for laminated glass in accordance with a second embodiment of the present invention. In FIG. 2, a section in the thickness direction of an interlayer film 11A is shown.

The interlayer film 11A shown in FIG. 2 includes a first layer 1A (intermediate layer), a second layer 2A (surface layer), and a third layer 3A (surface layer). The interlayer film 11 and the interlayer film 11A are different from each other in the increment of the thickness in the region where the thickness increases.

The first layer 1A is a layer having a glass transition temperature of less than 15° C. Each of the second layer 2A and the third layer 3A is a layer having a glass transition temperature of 15° C. or more.

The interlayer film 11A has one end 11*a* and the other end 11*b* being on an opposite side of the one end 11*a*. The one end 11*a* and the other end 11*b* are end parts of both sides facing each other. The sectional shapes in the thickness direction of the first layer 1A, the second layer 2A, and the third layer 3A are wedge-like shapes. The thicknesses of the first layer 1A, the second layer 2A, and the third layer 3A are larger in the other end 11*b* side than in the one end 11*a* side. Accordingly, the thickness of the other end 11*b* of the interlayer film 11A is larger than the thickness of the one end 11*a* thereof. The interlayer film 11A has a region being thin in thickness and a region being thick in thickness.

The interlayer film 11A has a region where the thickness increases from the one end 11*a* side to the other end 11*b* side. The interlayer film 11A has a portion where the increment of the thickness increases from the one end 11*a* side to the other end 11*b* side in the region where the thickness increases. The interlayer film 11A has a region with a wedge-like sectional shape in the thickness direction. The interlayer film 11A has a portion where the wedge angle increases from the one end side to the other end side in the region with a sectional shape in the thickness direction of a wedge-like shape.

The interlayer film 11A has a region for display R1 corresponding to a display region of a head-up display. The interlayer film 11A has a surrounding region R2 neighboring the region for display R1. The interlayer film 11A has a shading region R3 that is separate from the region for display R1. The shading region R3 is located in an edge portion of the interlayer film 11A.

The interlayer film has the shape shown in FIG. 2, and may have a two-layer structure or four or more-layer structure. The interlayer film has the shape shown in FIG. 2, and may lack a region for display and may lack a shading region. Also, the interlayer film has the shape shown in FIG. 2 in which the sectional shape in the thickness direction of the first layer may be rectangular, the sectional shape in the thickness direction of the second layer may be rectangular, and the sectional shape in the thickness direction of the third layer may be rectangular.

FIG. 3 is a sectional view schematically showing an interlayer film for laminated glass in accordance with a third embodiment of the present invention. In FIG. 3, a section in the thickness direction of an interlayer film 11B is shown.

The interlayer film 11B shown in FIG. 3 includes a first layer 1B (intermediate layer), a second layer 2B (surface layer), and a third layer 3B (surface layer). The interlayer film 11 and the interlayer film 11B are different from each other in the increment of the thickness in the region where the thickness increases.

The first layer 1B is a layer having a glass transition temperature of less than 15° C. Each of the second layer 2B and the third layer 3B is a layer having a glass transition temperature of 15° C. or more.

The interlayer film 11B has one end 11*a* and the other end 11*b* being on an opposite side of the one end 11*a*. The one end 11*a* and the other end 11*b* are end parts of both sides facing each other. The sectional shape in the thickness direction of each of the first layer 1B, the second layer 2B, and the third layer 3B is a wedge-like shape. The thicknesses of the first layer 1B, the second layer 2B, and the third layer 3B are larger in the other end 11*b* side than in the one end 11*a* side. Accordingly, the thickness of the other end 11*b* of the interlayer film 11B is larger than the thickness of the one end 11*a* thereof. The interlayer film 11B has a region being thin in thickness and a region being thick in thickness.

The interlayer film 11B has a region where the thickness increases from the one end 11*a* side to the other end 11*b* side. The interlayer film 11B has a portion where the increment of the thickness decreases from the one end 11*a* side to the other end 11*b* side in the region where the thickness increases. The interlayer film 11B has a region with a wedge-like sectional shape in the thickness direction. The interlayer film 11B has a portion where the wedge angle decreases from the one end side to the other end side in the region with a wedge-like sectional shape in the thickness direction.

The interlayer film 11B has a region for display R1 corresponding to a display region of a head-up display. The interlayer film 11B has a surrounding region R2 neighboring the region for display R1. The interlayer film 11B has a shading region R3 that is separate from the region for display R1. The shading region R3 is located in an edge portion of the interlayer film 11B.

The interlayer film has the shape shown in FIG. 3, and may have a two-layer structure or four or more-layer structure. The interlayer film has the shape shown in FIG. 3, and may lack a region for display and may lack a shading region. Also, the interlayer film has the shape shown in FIG. 3 in which the sectional shape in the thickness direction of the first layer may be rectangular, the sectional shape in the thickness direction of the second layer may be rectangular, and the sectional shape in the thickness direction of the third layer may be rectangular.

FIG. 4 is a sectional view schematically showing an interlayer film for laminated glass in accordance with a fourth embodiment of the present invention. In FIG. 4, a section in the thickness direction of an interlayer film 11C is shown.

The interlayer film 11C has one end 11*a* and the other end 11*b* being on an opposite side of the one end 11*a*. The one end 11*a* and the other end 11*b* are end parts of both sides facing each other. The sectional shape in the thickness direction of the first layer 1C is a wedge-like shape. The thickness of the first layer 1C is larger in the other end 11*b* side than in the one end 11*a* side. The thickness of the other end 11*b* of the interlayer film 11C is larger than the thickness of the one end 11*a* thereof. The interlayer film 11C has a region being thin in thickness and a region being thick in thickness.

The interlayer film 11C has a region where the thickness increases from the one end 11*a* side to the other end 11*b* side. In the interlayer film 11C, the increment of the thickness is constant from the one end 11*a* side to the other end 11*b* side in the region where the thickness increases.

The interlayer film 11C includes a first layer 1C (intermediate layer), a second layer 2C (surface layer), and a third layer 3C (surface layer). The second layer 2C and the third layer 3C are integrated at the one end 11*a* side and the other end 11*b* side. The first layer 1C is embedded between the second layer 2C and the third layer 3C. The interlayer film 11C has a part having a three-layer structure, and a part having a one-layer structure.

The first layer 1C is a layer having a glass transition temperature of less than 15° C. Each of the second layer 2C and the third layer 3C is a layer having a glass transition temperature of 15° C. or more.

The interlayer film 11C has a region for display R1 corresponding to a display region of a head-up display. The interlayer film 11C has a surrounding region R2 neighboring the region for display R1. The interlayer film 11C has a shading region R3 that is separate from the region for display R1. The shading region R3 is located in an edge portion of the interlayer film 11C.

In the region for display R1, the interlayer film 11C has a three-layer structure. In the region from the position of 100 mm to the position of 400 mm from the one end 11*a* toward the other end 11*b*, the interlayer film 11C has a three-layer structure.

In the interlayer film, the first layer may be a layer having a glass transition temperature of less than 15° C. or may be a layer having a glass transition temperature of 15° C. or more. In the interlayer film, each of the second layer and the third layer may be a layer having a glass transition temperature of less than 15° C. or may be a layer having a glass transition temperature of 15° C. or more.

In the interlayer film, the sectional shape in the thickness direction of the first layer may be a wedge-like shape, or may be a rectangular shape. It is preferred that the sectional shape in the thickness direction of the first layer be a wedge-like shape. In the interlayer film, the sectional shape in the thickness direction of each of the second layer and the third layer may be a wedge-like shape, or may be a rectangular shape. It is preferred that the sectional shape in the thickness direction of each of the second layer and the third layer be a wedge-like shape.

Hereinafter, materials that can be used in the interlayer film according to the present invention are specifically described.

(Thermoplastic Resin)

It is preferred that the interlayer film contain a resin (hereinafter, sometimes described as a resin (0)). It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a resin (hereinafter, sometimes described as a resin (1)). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a resin (hereinafter, sometimes described as a resin (2)). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a resin (hereinafter, sometimes described as a resin (3)). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The resin (1), the resin (2), and the resin (3) may be the same as or different from one another. For still higher sound insulating property, it is preferred that the resin (1) be different from the resin (2) and the resin (3). The thermoplastic resin (1), the thermoplastic resin (2), and the thermoplastic resin (3) may be the same or different from one another. For still higher sound insulating property, it is preferred that the thermoplastic resin (1) be different from the thermoplastic resin (2) and the thermoplastic resin (3). Each of the polyvinyl acetal resin (1), the polyvinyl acetal resin (2), and the polyvinyl acetal resin (3) may be the same or different from one another. For still higher sound insulating property, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, and is preferably 5000 or less, more preferably 4000 or less, further preferably 3500 or less. When the average polymerization degree is the above lower limit or more, the penetration resistance of the laminated glass is further enhanced. When the average polymerization degree is the above upper limit or less, formation of an interlayer film is facilitated.

The polymerization degree of the polyvinyl alcohol is determined by a method conforming to JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more, more preferably 18% by mole or more and is preferably 40% by mole or less, more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more. The content of the hydroxyl group (the amount of hydroxyl groups) of the polyvinyl acetal resin (1) is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, when being 30% by mole or less, the sound insulating property of the laminated glass are further enhanced, and when being 28% by mole or less, the sound insulating property is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, still more preferably 30% by mole or more, further preferably more than 31 by mole, still further preferably 31.5% by mole or more, especially preferably 32% by mole or more, and most preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of further enhancing the sound insulating property, it is preferred that the content of the hydroxyl group of the polyvinyl acetal resin (1) be lower than the content of the hydroxyl group of the polyvinyl acetal resin (3). From the viewpoint of still further enhancing the sound insulating property, the absolute value of difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating property, the absolute value of difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (2) is preferably 20% by mole or less. An absolute value of difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more and more preferably 0.5% by mole or more and is preferably 10% by mole or less and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more, and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method conforming to JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method conforming to JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the interlayer film, the content of the polyvinyl acetal resin may be 100% by weight or less. It is preferred that the main ingredient (50% by weight or more) of the thermoplastic resin of the interlayer film be a polyvinyl acetal resin.

In 100% by weight of the thermoplastic resin contained in the first layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first layer, the content of the polyvinyl acetal resin may be 100% by weight or less. It is preferred that the main ingredient (50% by weight or more) of the thermoplastic resin of the first layer be a polyvinyl acetal resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the second layer, the content of the polyvinyl acetal resin may be 100% by weight or less. It is preferred that the main ingredient (50% by weight or more) of the thermoplastic resin of the second layer be a polyvinyl acetal resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the third layer, the content of the polyvinyl acetal resin may be 100% by weight or less. It is preferred that the main ingredient (50% by weight or more) of the thermoplastic resin of the third layer be a polyvinyl acetal resin.

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers and organic phosphite plasticizers, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. As the organic ester plasticizer, other organic ester plasticizer than those recited above may be used. As the adipic acid ester, adipic acid esters other than the aforementioned adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

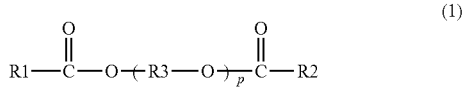

(1)

in the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate (3GO).

In the interlayer film, the content of the plasticizer (0) relative to 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of the laminated glass is further enhanced. When the content (0) is the above upper limit or less, the transparency of the interlayer film is further enhanced.

In the first layer, the content of the plasticizer (1) per 100 parts by weight of the thermoplastic resin (1) is defined as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of the laminated glass is further enhanced.

In the second layer, the content of the plasticizer (2) relative to 100 parts by weight of the thermoplastic resin (2) is defined as a content (2). In the third layer, the content of the plasticizer (3) relative to 100 parts by weight of the thermoplastic resin (3) is defined as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of the laminated glass is further enhanced.

For the purpose of enhancing the sound insulating property of the laminated glass, it is preferred that the content (1) be larger than the content (2) and it is preferred that the content (1) be larger than the content (3).

From the viewpoint of further enhancing the sound insulating property of the laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance. It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film contain at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone and two or more kinds thereof may be used in combination.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding property of the interlayer film and the laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding property and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding property is sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding property of the laminated glass, it is more preferred that the heat shielding particles be metal oxide particles. It is preferred that the heat shielding particle be a particle (a metal oxide particle) formed from an oxide of a metal.

The energy amount of an infrared ray with a wavelength (780 nm or more) that is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, tungsten oxide particles, tin-doped indium oxide particles (ITO particles), tin-doped zinc oxide particles and silicon-doped zinc oxide particles, and lanthanum hexaboride ($LaB_6$) particles, and the like. Heat shielding particles other than these may be used as the heat shielding particles. Since the heat ray shielding function is high, the heat shielding particles are preferably metal oxide particles, and more preferably ATO particles, GZO particles, IZO particles, ITO particles or tungsten oxide particles. In particular, since the heat ray shielding function is high and the particles are readily available, it is preferred that the heat shielding particles be ITO particles or tungsten oxide particles.

From the viewpoint of further enhancing the heat shielding property of the interlayer film and the laminated glass, it is preferred that the tungsten oxide particles be metal-doped tungsten oxide particles. Examples of the "tungsten oxide particles" include metal-doped tungsten oxide particles. Examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding property of the interlayer film and the laminated glass, cesium-doped tungsten oxide particles are especially preferred. From the viewpoint of still further enhancing the heat shielding property of the interlayer film and the laminated glass, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding property is sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), each content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, or a third layer), each content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film contain at least one kind of metal salt (hereinafter, sometimes described as Metal salt M) of alkali metal salts and alkali earth metal salts. It is preferred that the first layer contain the Metal salt M. It is preferred that the second layer contain the Metal salt M. It is preferred that the third layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt contained in the interlayer film contain at least one kind of metal between K and Mg.

As the metal salt M, an alkali metal salt of an organic acid having 2 to 16 carbon atoms, and an alkali earth metal salt of an organic acid having 2 to 16 carbon atoms can be used. The metal salt M may include a magnesium carboxylate having 2 to 16 carbon atoms, or a potassium carboxylate having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the interlayer film containing the Metal salt M or a layer containing the Metal salt M (a first layer, a second layer, or a third layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), and an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASE Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl) oxalic acid diamide, N-(2-ethylphenyl)-N'-(2-ethoxyphenyl) oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, decrease in visible light transmittance after a lapse of a certain period of time is further suppressed. In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 2.5% by weight or less, more preferably 2% by weight or less, further preferably 1% by weight or less, especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy) (2-ethylhexyloxy) phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, and the third layer may contain additives such as a coupling agent, a dispersing agent, a surfactant, a flame retardant, an antistatic agent, an adhesive force adjusting agent other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The interlayer film may be wound to be formed into a roll body of the interlayer film. The roll body may include a winding core and an interlayer film wound on the outer periphery of the winding core.

The method for producing the interlayer film is not particularly limited.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method (melt fracture method), an emboss roll method, a calender roll method, and a profile extrusion method, and the like.

It is preferred that the interlayer film have protrusions and recesses formed by a melt fracture method or an emboss roll method on the surface, and it is more preferred that the interlayer film have protrusions and recesses formed by a melt fracture method or an emboss roll method with a linear pressure of 0.10 kN/cm or less on the surface. By using the above method, it is possible to favorably impart protrusions and recesses even when the thickness of the surface layer is relatively small, and hence it is possible to effectively suppress the optical strain.

(Laminated Glass)

The laminated glass according to the present invention includes a first lamination glass member, a second lamination glass member and the aforementioned interlayer film for laminated glass. In the laminated glass according to the present invention, the above-mentioned interlayer film for laminated glass is arranged between the first lamination glass member and the second lamination glass member.

The laminated glass according to the present invention has one end and the other end being on an opposite side of the one end. The one end and the other end are end parts of both sides facing each other in the laminated glass. In the laminated glass according to the present invention, the other end has a thickness that is larger than a thickness of the one end.

The laminated glass is, for example, a head-up display. When the laminated glass is a head-up display, the laminated glass has a display region of the head-up display. The display region is a region capable of favorably displaying information.

It is preferred that the laminated glass serve as a head-up display (HUD)).

A head-up display system can be obtained by using the aforementioned head-up display. The head-up display system includes the laminated glass, and a light source device for irradiating the laminated glass with light for image display. The light source device can be attached, fox example, to a dashboard in a vehicle. By irradiating the display region of the laminated glass with light from the light source device, it is possible to achieve image display.

In the laminated glass, the interlayer film includes at least one layer having a glass transition temperature of less than 15° C.

In the laminated glass, when the interlayer film has a thickness of X µm and a total thickness of the at least one layer having a glass transition temperature of less than 15° C. is denoted by Y µm, the interlayer film has a region where a value of Y/X is 0.12 or more (region A).

In the laminated glass, an average thickness of each surface layer of the interlayer film in the region from the position of 100 mm to the position of 400 mm from the one end toward the other end is less than 300 µm, or an average thickness of each surface layer of the interlayer film in the display region is less than 300 µm.

Since the laminated glass according to the present invention is provided with the above-mentioned configuration, the sound insulating property can be enhanced. Since the laminated glass according to the present invention is provided with the above-mentioned configuration, the penetration resistance can be enhanced and the optical strain can be suppressed.

FIG. 5 is a sectional view schematically showing an example of laminated glass prepared with the interlayer film for laminated glass shown in FIG. 1.

A laminated glass 21 shown in FIG. 5 includes a first lamination glass member 31, a second lamination glass member 32, and the interlayer film 11. The interlayer film 11 is arranged between the first lamination glass member 31 and the second lamination glass member 32 to be sandwiched therebetween. The first lamination glass member 31 is layered on a first surface (one surface) of the interlayer film 11. The second lamination glass member 32 is layered on a second surface (other surface) opposite to the first surface of the interlayer film 11. The first lamination glass member 31 is layered on the outer surface of the second layer 2 in the interlayer film 11. The second laminator glass member 32 is layered on the outer surface of the third layer 3 in the interlayer film 11.

As described above, the laminated glass according to the present invention includes a first lamination glass member, a second lamination glass member, and an interlayer film, and the interlayer film is the interlayer film for laminated glass according to the present invention. In the laminated glass according to the present invention, the interlayer film is arranged between the first lamination glass member and the second lamination glass member.

In the laminated glass, it is preferred that the steel ball fail to penetrate in the following penetration resistance test.

Penetration resistance test: The laminated glass is stored in an environment of 23±2° C. for 4 hours or more so that the surface temperature of the laminated glass is 23° C. For one laminated glass after the storing, a steel ball having a weight of 2260±20 g and a diameter of 82 mm is dropped to a center part of a principal plane of the laminated glass from a height of 6.5 m in accordance with JIS R3212:2015. It is judged that the steel ball fails to penetrate when the steel ball fails to penetrate the laminated glass in 5 seconds after colliding with the laminated glass.

It is preferred that in the laminated glass, when the measurement of optical strain is conducted, the optical strain value of the laminated glass be 2.0 or less.

From the viewpoint of further suppressing the generation of an optical strain, the optical strain value of the laminated glass is preferably 1.8 or less, more preferably 1.7 or less. It is preferred that the optical strain value be as small as possible.

Measurement of optical strain: An optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image is prepared. As the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm are prepared. The laminated glass and the laminated glass for calibration are stored in an environment of 23±2° C. for 4 hours or more so that the surface temperature of the laminated glass and the laminated glass for calibration is 23° C. An optical strain value of the laminated glass is measured by using the optical strain inspection apparatus that is adjusted so that an optical strain value in a condition that no measuring object is placed is 1.30 and an optical strain value of the laminated glass for calibration is 1.14 when the following processing operation in the image processing part is executed.

Processing operation in image processing part: Each pixel of the gray image is converted to a numerical value of 0 to 255 according to the shading of the gray image. A region of 400 pixels×400 pixels formed by connecting four points of pixel coordinates (120, 40), (520, 40), (120, 440), and (520, 440) of the gray image is divided into 16 windows in total each containing 100 pixels×100 pixels. From the first column to the one hundredth column of pixel coordinates of each window, respective variances are calculated from the numerical values of 100 pixels of the same column. An average value of 100 variances is determined as an "optical strain of a window". An average "optical strain of a window" is determined, as an "optical strain of a measuring object", from the "optical strain of a window" determined in each of the 16 windows.

More specifically, measurement of optical strain of the laminated glass is executed in the same manner as described above.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde that has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method conforming to JIS K6728 "Testing methods for polyvinyl butyral" were exhibited.

Example 1

Preparation of Composition for Forming First Layer:

The following ingredients were mixed, and kneaded sufficiently with a mixing roll to obtain a composition for forming a first layer.

Polyvinyl acetal resin (average polymerization degree: 3000, content of hydroxyl group: 22% by mole, acetylation degree: 13% by mole, acetalization degree: 65% by mole): 100 parts by weight Triethylene glycol di-2-ethylhexanoate (3GO) 30 parts by weight An amount that is to be 0.2% by weight in the obtained first layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer of BHT (2,6-di-t-butyl-p-cresol)

Preparation of Composition for Forming Second Layer and Third Layer:

The following ingredients were mixed, and kneaded sufficiently with a mixing roll to obtain a composition for forming a second layer and a third layer.

Polyvinyl acetal resin (average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO) 48 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer and third layer of BHT (2,6-di-t-butyl-p-cresol)

Preparation of Interlayer Film:

By coextruding the composition for forming a first layer and the composition for forming a second layer and a third layer using a coextruder, an interlayer film before embossing having a three-layer structure (second layer/first layer/third layer) was obtained. The obtained interlayer film before embossing was subjected to embossing by an emboss roll method with a linear pressure of 0.10 kN/cm to prepare an interlayer film (interlayer film having the shape of FIG. 1). The obtained interlayer film was wound into a roll.

Examples 2 to 5 and Comparative Example 1

An interlayer film (interlayer film having the shape of FIG. 1) having a three-layer structure (second layer/first layer/third layer) was produced in the same manner as that in Example 0.1 except that the configuration of the interlayer film was changed as shown in Table 1.

Examples 6, 7

An interlayer film (interlayer film having the shape of FIG. 1) having a three-layer structure (second layer/first layer/third layer) was produced in the same manner as that in Example 1 except that the linear pressure for imparting protrusions and recesses to the surface of the interlayer film was changed as shown in Table 2 in the production step of the interlayer film, and the configuration of the interlayer film was changed as shown in Table 2.

Example 8

An interlayer film (interlayer film having the shape of FIG. 1) having a three-layer structure (second layer/first layer/third layer) was produced in the same manner as that in Example 1 except that protrusions and recesses were imparted to the surface of the interlayer film by a melt fracture method in the production step of the interlayer film, and the configuration of the interlayer film was changed as shown in Table 2.

(Evaluation)

(1) Glass Transition Temperature Tg

The interlayer film was stored for 12 hours in an environment of a room temperature of 23 t 2° C. and a humidity of 25±5%. Then, viscoelasticity was measured using a viscoelasticity measuring device "ARES-G2" available from TA Instruments. A parallel plate with a diameter of 3 mm was used as a jig, and the measurement was performed in a shearing mode under the condition in which the temperature was decreased from 100° C. to −20° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.). In this manner, glass transition temperatures of the first layer, the second layer, and the third layer in the obtained interlayer film were determined.

(2) Thickness

Thickness of the interlayer film was measured with a contact-type thickness meter "TOF-4R" available from Yamabun Electronics Co., Ltd. by the method described above. Also, using a non-contact type multilayer film thickness measurement device "OPTIGAUGE" (available from Lumetrics, Inc.), thicknesses of the first layer, the second layer, and the third layer were measured by the method described above. Also, by the method described above, Y/X was measured, and existence of a region having a value of Y/X of 0.12 or more (region A) was examined. Also, an average thickness of each surface layer in the region from the position of 100 mm to the position of 400 mm from the one end toward the other end of the interlayer film (region B) was calculated.

(3) Penetration Resistance Test

A laminated glass X was prepared with the obtained interlayer film by the method described above. Using the laminated glass X, a penetration resistance test was conducted by the method described above. The penetration resistance test was conducted by the test of dropping a steel ball, from the height of 6.5 m and by the test of dropping a steel ball from the height of 5.5 m. In Tables, the case where the steel ball fails to penetrate the laminated glass X in 5 seconds after collision of the steel ball with the laminated glass X is indicated by "A", and the case where the steel ball penetrates the laminated glass X in 5 seconds after collision of the steel ball with the laminated glass X is indicated by "B".

(4) Optical Strain Value

A laminated glass Y was prepared with the obtained interlayer film by the method described above. Using the laminated glass Y, measurement of optical strain was conducted by the method described above.

(5) Sound Insulating Property

The obtained interlayer film was cut into a size of 55 cm long×55 cm wide. Next, the interlayer film was sandwiched between one sheet of clear float glass (50 cm long×50 cm wide×2 mm thick) and one sheet of clear float glass (50 cm long×50 cm wide×1.6 mm thick) to obtain a laminate. The laminate was put into a rubber bag and the inside thereof was degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a laminated glass.

The sound insulating property of the laminated glass was evaluated by sound transmission loss. The sound transmission loss was measured at 20° C. in accordance with JIS A1441-1. Specifically, measurement was conducted in the following manner.

The prepared laminated glass was placed in an opening part between a sound source room and a sound receiving room. At a location of 13 cm apart from the sample in the niche opening part of the sound receiving room side, scanning was conducted with a sound intensity probe "SI-34" available from RION Co., Ltd. to measure an average sound intensity level. The scanning time was 25 seconds to 40 seconds, and the scanning speed was 0.15 m/s to 0.2 m/s. From an average of the two scanning patterns, a sound transmission loss (TL value) at a sound frequency of 6300 Hz was determined. The sound insulating property was judged according to the following criteria.

[Criteria for Judgment in Sound Insulating Property]

○: TL value at sound frequency of 6300 Hz is 39.5 or more x: TL value at sound frequency of 6300 Hz is less than 39.5

Configurations of interlayer films and results are shown in the following Tables 1, 2.

TABLE 1

|  |  |  | Example 1 | Example 2 | Example 3 | Example 4 | Example 5 |
|---|---|---|---|---|---|---|---|
|  | Configuration of interlayer film |  | Three layers | Three layers | Three layers | Three layers | Three layers |
|  | Glass transition temperature Tg of first layer (intermediate layer) | ° C. | 2 | 2 | 2 | −6 | −2 |
|  | Glass transition temperature Tg of second layer and third layer (surface layer) | ° C. | 16 | 16 | 16 | 16 | 16 |
|  | Content of plasticizer per 100 parts by weight of thermoplastic resin in first layer (intermediate layer) | parts by weight | 30 | 30 | 30 | 70 | 50 |
|  | Content of plasticizer per 100 parts by weight of thermoplastic resin in second layer and third layer (surface layer) | parts by weight | 48 | 48 | 48 | 48 | 48 |
|  | Content of plasticizer per 100 parts by weight of thermoplastic resin in interlayer film | parts by weight | 38 | 37 | 40 | 51 | 49 |
|  | Press method |  | Emboss roll | Emboss roll | Emboss roll | Emboss roll | Emboss roll |
|  | Linear pressure | kN/cm | 0.10 | 0.10 | 0.10 | 0.10 | 0.10 |
| One end | Thickness of interlayer film (X, minimum thickness of interlayer film) | μm | 800 | 800 | 800 | 549 | 800 |
|  | Thickness of first layer (Y) | μm | 440 | 500 | 360 | 69 | 440 |
|  | Thickness of each of second and third layers | μm | 180 | 150 | 220 | 240 | 180 |
|  | Value of Y/X |  | 0.550 | 0.625 | 0.450 | 0.125 | 0.550 |
| Other end | Thickness of interlayer film (X, maximum thickness of interlayer film) | μm | 1181 | 1423 | 1016 | 749 | 1374 |
|  | Thickness of first layer (Y) | μm | 649 | 889 | 428 | 93 | 756 |
|  | Thickness of each of second and third layers | μm | 266 | 267 | 294 | 328 | 309 |
|  | Value of Y/X |  | 0.550 | 0.625 | 0.421 | 0.124 | 0.550 |
|  | Existence of region A where value or Y/X is 0.12 is more |  | Exist | Exist | Exist | Exist | Exist |
|  | Average thickness of first layer in region B from position of 100 mm to position of 400 mm from one end toward other end | μm | 528 | 675 | 414 | 78 | 550 |
|  | Average thickness of each of second and third layers in region B from position of 100 um to position of 400 mm from one end toward other end | μm | 216 | 203 | 253 | 275 | 225 |
| Penetration resistance test | Height 6.5 m | Judgement | A | A | A | B | B |
|  | Height 5.5 m | Judgement | A | A | A | A | A |
|  | Optical strain value |  | 1.87 | 1.96 | 1.75 | 1.69 | 1.87 |
|  | Sound insulating property | Judgement | ○ | ○ | ○ | ○ | ○ |

TABLE 2

|  |  |  | Example 6 | Example 7 | Example 8 | Comparative Example 1 |
|---|---|---|---|---|---|---|
|  | Configuration of interlayer film |  | Three layers | Three layers | Three layers | Three layers |
|  | Glass transition temperature Tg of first layer (intermediate layer) | ° C. | 2 | 2 | 2 | 2 |
|  | Glass transition temperature Tg of second layer and third layer (surface layer) | ° C. | 16 | 16 | 16 | 16 |
|  | Content of plasticizer per 100 parts by weight of thermoplastic resin in first layer (intermediate layer) | parts by weight | 30 | 30 | 30 | 30 |
|  | Content of plasticizer per 100 parts by weight of thermoplastic resin in second layer and third layer (surface layer) | parts by weight | 48 | 48 | 48 | 48 |
|  | Content of plasticizer per 100 parts by weight of thermoplastic resin in interlayer film | parts by weight | 37 | 40 | 38 | 46 |
|  | Press method |  | Emboss roll | Emboss roll | Melt fracture | Emboss roll |
|  | Linear pressure | kN/cm | 0.15 | 0.14 | — | 0.10 |
| One end | Thickness of interlayer film (X, minimum thickness of interlayer film) | μm | 800 | 800 | 800 | 548 |
|  | Thickness of first layer (Y) | μm | 500 | 360 | 440 | 68 |
|  | Thickness of each of second and third layers | μm | 150 | 220 | 150 | 240 |
|  | Value of Y/X |  | 0.625 | 0.450 | 0.550 | 0.124 |
| Other end | Thickness of interlayer film (X, maximum thickness of interlayer film) | μm | 1423 | 1160 | 1181 | 916 |
|  | Thickness of first layer (Y) | μm | 889 | 522 | 649 | 114 |
|  | Thickness of each of second and third layers | μm | 267 | 319 | 266 | 401 |
|  | Value of Y/X |  | 0.625 | 0.450 | 0.550 | 0.124 |
|  | Existence of region A where value or Y/X is 0.12 is more |  | Exist | Exist | Exist | Exist |
|  | Average thickness of first layer in region B from position of 100 mm to position of 400 mm from one end toward other end | μm | 675 | 432 | 528 | 85 |
|  | Average thickness of each of second and third layers in region B from position of 100 um to position of 400 mm from one end toward other end | μm | 203 | 264 | 216 | 301 |
| Penetration resistance test | Height 6.5 m | Judgement | A | A | A | A |
|  | Height 5.5 m | Judgement | A | A | A | A |
|  | Optical strain value |  | 2.75 | 2.38 | 1.92 | 1.69 |
|  | Sound insulating property | Judgement | ○ | ○ | ○ | X |

EXPLANATION OF SYMBOLS 1, 1A, 1B, 1C: First layer
2, 2A, 2B, 2C: Second layer
3, 3A, 3B, 3C: Third layer
11, 11A, 11B, 11C: Interlayer film
11a: One end
11b: Other end
21: Laminated glass
31: First lamination glass member
32: Second lamination glass member
41: Optical strain inspection apparatus
42: Light source unit
43: Slit part
44: Measuring object placing part
45: Projection plane
46: Image inputting part
47: Image processing part
48: Pedestal
49: Evaluation part
421: Light emitting part
422: Optical fiber
423: Irradiation port
481: Pedestal body
482: Arm
A: Optical axis
R1: Region for display
R2: Surrounding region
R3: Shading region
W: Measuring object

The invention claimed is:

1. An interlayer film for laminated glass, the interlayer film having a two or more-layer structure, the interlayer film comprising:
  one end and the other end being on an opposite side of the one end, the other end having a thickness larger than a thickness of the one end;
  the interlayer film having a portion with a sectional shape in a thickness direction of a wedge shape in a region between a position of 6 cm from the one end toward the other end of the interlayer film and a position of 63.8 cm from the one end toward the other end;
  at least one layer having a glass transition temperature of less than 15° C.; and
  a region where a value of Y/X is 0.12 or more, provided that the interlayer film has a thickness of X μm and a total thickness of the at least one layer having a glass transition temperature of less than 15° C. is denoted by Y μm,
  the region where the value of Y/X is 0.12 or more existing from the position of 0 mm to the position of 400 mm from the one end toward the other end, and
  the interlayer film having an average thickness of each surface layer in a region, the region from a position of 100 mm to a position of 400 mm from the one end toward the other end, of less than 300 μm,
  wherein a distance between the one end and the other end of the interlayer film is 0.8 m or more and a maximum thickness of each surface layer is 350 μm or less, and
  wherein the sectional shape in the thickness direction of each surface layer is a wedge shape and a thickness of each surface layer is larger in the other end side of the interlayer film than in the one end side of the interlayer film.

2. The interlayer film for laminated glass according to claim 1, wherein when the interlayer film is arranged between clear glasses having a thickness of 2.5 mm conforming to JIS R3202: 1996 to obtain a laminated glass X having a size of 30 cm long and 30 cm wide, and the laminated glass X obtained is subjected to a penetration resistance test, a steel ball fails to penetrate,
  the penetration resistance test comprising:
    storing the laminated glass X in an environment of 23±2° C. for 4 hours or more so that a surface temperature of the laminated glass X is 23° C.;
    for one laminated glass X after the storing, dropping a steel ball having a weight of 2260±20 g and a diameter of 82 mm to a center part of a principal plane of the laminated glass X from a height of 6.5 m in accordance with JIS R3212: 2015; and
    judging that the steel ball fails to penetrate when the steel ball fails to penetrate the laminated glass X in 5 seconds after colliding with the laminated glass X.

3. The interlayer film for laminated glass according to claim 1, wherein when the interlayer film is arranged between clear glasses having a thickness of 2.5 mm conforming to JIS R3202: 1996 to obtain a laminated glass Y having a size of 15 cm long and 30 cm wide, and the laminated glass Y obtained is subjected to measurement of optical strain, an optical strain value of the laminated glass Y is 2.0 or less,
  the measurement of optical strain comprising:
    preparing an optical strain inspection apparatus comprising a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image;
    preparing, as the measuring object, two measuring objects, namely, the laminated glass Y, and a laminated glass for calibration obtained by arranging a monolayer interlayer film for calibration having a visible light transmittance of 88% between two sheets of clear float glass having a thickness of 2.5 mm;
    storing the laminated glass Y and the laminated glass for calibration in an environment of 23±2° C. for 4 hours or more so that a surface temperature of the laminated glass Y and the laminated glass for calibration is 23° C.; and
    measuring an optical strain value of the laminated glass Y by using the optical strain inspection apparatus that is adjusted so that an optical strain value in a condition that no measuring object is placed is 1.30 and an optical strain value of the laminated glass for calibration is 1.14, provided that a processing operation in the image processing part is executed, the processing operation in the image processing part comprising:
      converting each pixel of the gray image to a pixel value of 0 to 255 according to the shading of the gray image, and dividing a region of 400 pixels×400 pixels formed by connecting four points of pixel coordinates (120, 40), (520, 40), (120, 440), and (520, 440) of the gray image into 16 windows in total each containing 100 pixels×100 pixels;
      in each of the 16 windows, calculating a "variance of pixel values" for 100 pixels in each of a first column to a one hundredth column of pixel coordinates;
      determining an average "variance of pixel values", as an "optical strain of a window", from the "variance of pixel values" calculated in each of the first column to the one hundredth column; and determining an average "optical strain of a window", as an "optical strain of a measuring object", from the "optical strain of a window" determined in each of the 16 windows.

4. The interlayer film for laminated glass according to claim 3, wherein the interlayer film further comprises at least two sides, each side comprising a surface, and the interlayer film comprises protrusions and recesses on at least one surface of the two sides.

5. The interlayer film for laminated glass according to claim 3, further comprising protrusions and recesses formed by a melt fracture method on a surface.

6. The interlayer film for laminated glass according to claim 1, having protrusions and recesses formed by a melt fracture method on a surface.

7. The interlayer film for laminated glass according to claim 1, wherein the interlayer film further comprises at least two sides, each side comprising a surface, and the interlayer film comprises protrusions and recesses on at least one surface of the two sides.

8. The interlayer film for laminated glass according to claim 1, wherein the average thickness of each surface layer in the region from the position of 100 mm to the position of 400 mm from the one end toward the other end is 290 μm or less.

9. The interlayer film for laminated glass according to claim 1, having a three or more-layer structure.

10. The interlayer film for laminated glass according to claim 1, wherein the distance between the one end and the other end of the interlayer film is 1 m or more.

11. The interlayer film for laminated glass according to claim 1, wherein the maximum thickness of each surface layer is 328 μm or less.

12. The interlayer film for laminated glass according to claim 1, wherein the distance between the one end and the other end of the interlayer film is 1 m or more and the maximum thickness of each surface layer is 328 μm or less.

13. A laminated glass comprising:
a first lamination glass member;
a second lamination glass member; and
the interlayer film for laminated glass according to claim 1,
the interlayer film for laminated glass being arranged between the first lamination glass member and the second lamination glass member.

14. An interlayer film for laminated glass for use in a laminated glass that is a head-up display,
the interlayer film having a two or more-layer structure, the interlayer film comprising:
a region for display corresponding to a display region of the head-up display;
one end and the other end being on an opposite side of the one end, the other end having a thickness larger than a thickness of the one end;
at least one layer having a glass transition temperature of less than 15° C.; and
a region where a value of Y/X is 0.12 or more when the interlayer film has a thickness of X μm and a total thickness of the at least one layer having a glass transition temperature of less than 15° C. is denoted by Y μm,
the interlayer film having an average thickness of each surface layer in the region for display of less than 300 μm,
wherein a distance between the one end and the other end of the interlayer film is 0.8 m or more and a maximum thickness of each surface layer is 350 μm or less, and wherein the sectional shape in the thickness direction of each surface layer is a wedge shape and a thickness of each surface layer is larger in the other end side of the interlayer film than in the one end side of the interlayer film.

15. The interlayer film for laminated glass according to claim 14, wherein when the interlayer film is arranged between clear glasses having a thickness of 2.5 mm conforming to JIS R3202: 1996 to obtain a laminated glass X having a size of 30 cm long and 30 cm wide, and the laminated glass X obtained is subjected to a penetration resistance test, a steel ball fails to penetrate, the penetration resistance test including:
storing the laminated glass X in an environment of 23±2° C. for 4 hours or more so that a surface temperature of the laminated glass X is 23° C.; for one laminated glass X after the storing, dropping a steel ball having a weight of 2260±20 g and a diameter of 82 mm to a center part of a principal plane of the laminated glass X from a height of 6.5 m in accordance with JIS R3212: 2015; and judging that the steel ball fails to penetrate when the steel ball fails to penetrate the laminated glass X in 5 seconds after colliding with the laminated glass X.

16. The interlayer film for laminated glass according to claim 14, wherein when the interlayer film is arranged between clear glasses having a thickness of 2.5 mm conforming to JIS R3202: 1996 to obtain a laminated glass Y having a size of 15 cm long and 30 cm wide, and the laminated glass Y obtained is subjected to measurement of optical strain, an optical strain value of the laminated glass Y is 2.0 or less, the measurement of optical strain including:
preparing an optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image;
preparing, as the measuring object, two measuring objects, namely, the laminated glass Y, and a laminated glass for calibration obtained by arranging a monolayer interlayer film for calibration having a visible light transmittance of 88% between two sheets of clear float glass having a thickness of 2.5 mm; storing the laminated glass Y and the laminated glass for calibration in an environment of 23±2° C. for 4 hours or more so that a surface temperature of the laminated glass Y and the laminated glass for calibration is 23° C.; and measuring an optical strain value of the laminated glass Y by using the optical strain inspection apparatus that is adjusted so that an optical strain value in a condition that no measuring object is placed is 1.30 and an optical strain value of the laminated glass for calibration is 1.14 when a processing operation in the image processing part is executed, the processing operation in the image processing part including:
converting each pixel of the gray image to a pixel value of 0 to 255 according to the shading of the gray image, dividing a region of 400 pixels×400 pixels formed by connecting four points of pixel coordinates (120, 40), (520, 40), (120, 440), and (520, 440) of the gray image into 16 windows in total each containing 100 pixels× 100 pixels; in each of the 16 windows, calculating a "variance of pixel values" for 100 pixels in each of a first column to a one hundredth column of pixel coordinates; determining an average "variance of pixel values", as an "optical strain of a window", from the "variance of pixel values" calculated in each of the first column to the one hundredth column; and determining an average "optical strain of a window", as an "optical strain of a measuring object", from the "optical strain of a window" determined in each of the 16 windows.

17. The interlayer film for laminated glass according to claim 14, having protrusions and recesses formed by a melt fracture method on a surface.

18. A laminated glass comprising:
a first lamination glass member;
a second lamination glass member; and
the interlayer film for laminated glass according to claim 14,
the interlayer film for laminated glass being arranged between the first lamination glass member and the second lamination glass member.

19. A laminated glass comprising:
one end and the other end being on an opposite side of the one end, the other end having a thickness larger than a thickness of the one end;
a first lamination glass member;
a second lamination glass member; and
an interlayer film for laminated glass, the interlayer film arranged between the first lamination glass member and the second lamination glass member,
the interlayer film having a two or more-layer structure,
the interlayer film including at least one layer having a glass transition temperature of less than 15° C.,
the interlayer film having a region where a value of Y/X is 0.12 or more when the interlayer film has a thickness of X μm and a total thickness of the at least one layer having a glass transition temperature of less than 15° C. is denoted by Y μm,
the interlayer film having an average thickness of each surface layer in a region, the region from a position of 100 mm to a position of 400 mm from the one end toward the other end, of less than 300 μm,
wherein a distance between the one end and the other end of the interlayer film is 0.8 m or more and a maximum thickness of each surface layer is 350 μm or less, and
wherein the sectional shape in the thickness direction of each surface layer is a wedge shape and a thickness of each surface layer is larger in the other end side of the interlayer film than in the one end side of the interlayer film.

20. The laminated glass according to claim 19, wherein when a penetration resistance test is conducted, a steel ball fails to penetrate, the penetration resistance test including:
storing the laminated glass in an environment of 23±2° C. for 4 hours or more so that a surface temperature of the laminated glass is 23° C.; for one laminated glass after the storing, dropping a steel ball having a weight of 2260±20 g and a diameter of 82 mm to a center part of a principal plane of the laminated glass from a height of 6.5 m in accordance with JIS R3212: 2015; and judging that the steel ball fails to penetrate when the steel ball fails to penetrate the laminated glass in 5 seconds after colliding with the laminated glass.

21. The laminated glass according to claim 19, wherein when measurement of optical strain is executed, an optical strain value of the laminated glass is 2.0 or less, the measurement of optical strain including:
preparing an optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image;
preparing, as the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm; storing the laminated glass and the laminated glass for calibration in an environment of 23±2° C. for 4 hours or more so that a surface temperature of the laminated glass and the laminated glass for calibration is 23° C.; and measuring an optical strain value of the laminated glass by using the optical strain inspection apparatus that is adjusted so that an optical strain value in a condition that no measuring object is placed is 1.30 and an optical strain value of the laminated glass for calibration is 1.14 when a processing operation in the image processing part is executed, the processing operation in the image processing part including:
converting each pixel of the gray image to a numerical value of 0 to 255 according to the shading of the gray image, dividing a region of 400 pixels×400 pixels formed by connecting four points of pixel coordinates (120, 40), (520, 40), (120, 440), and (520, 440) of the gray image into 16 windows in total each containing 100 pixels×100 pixels; in each of the 16 windows, calculating a "variance of pixel values" for 100 pixels in each of a first column to a one hundredth column of pixel coordinates; determining an average "variance of pixel values", as an "optical strain of a window", from the "variance of pixel values" calculated in each of the first column to the one hundredth column; and determining an average "optical strain of a window", as an "optical strain of a measuring object", from the "optical strain of a window" determined in each of the 16 windows.

22. A laminated glass that is a head-up display, the laminated glass comprising:
one end and the other end being on an opposite side of the one end, the other end having a thickness larger than a thickness of the one end;
a display region of the head-up display;
a first lamination glass member;
a second lamination glass member; and
an interlayer film for laminated glass, the interlayer film arranged between the first lamination glass member and the second lamination glass member,
the interlayer film having a two or more-layer structure,
the interlayer film including at least one layer having a glass transition temperature of less than 15° C.,
the interlayer film having a region where a value of Y/X is 0.12 or more when the interlayer film has a thickness of X μm and a total thickness of the at least one layer having a glass transition temperature of less than 15° C. is denoted by Y μm,
the interlayer film having an average thickness of each surface layer in the display region of less than 300 μm,
wherein a distance between the one end and the other end of the interlayer film is 0.8 m or more and a maximum thickness of each surface layer is 350 μm or less, and wherein the sectional shape in the thickness direction of each surface layer is a wedge shape and a thickness of each surface layer is larger in the other end side of the interlayer film than in the one end side of the interlayer film.

23. The laminated glass according to claim 22, wherein when a penetration resistance test is conducted, a steel ball fails to penetrate, the penetration resistance test including:
storing the laminated glass in an environment of 23±2° C. for 4 hours or more so that a surface temperature of the laminated glass is 23° C.; for one laminated glass after the storing, dropping a steel ball having a weight of 2260±20 g and a diameter of 82 mm to a center part of a principal plane of the laminated glass from a height of 6.5 m in accordance with JIS R3212: 2015; and judging that the steel ball fails to penetrate when the steel ball fails to penetrate the laminated glass in 5 seconds after colliding with the laminated glass.

24. The laminated glass according to claim 22, wherein when measurement of optical strain is executed, an optical strain value of the laminated glass is 2.0 or less, the measurement of optical strain including:
preparing an optical strain inspection apparatus including a light source unit configured to emit irradiation light, a projection plane on which the irradiation light having penetrated a measuring object is to be projected, an image inputting part configured to photograph the projection plane to generate a gray image, and an image processing part configured to calculate an optical strain value according to a degree of variation in shading of the gray image;
preparing, as the measuring object, two measuring objects, namely, the laminated glass, and a laminated glass for calibration obtained by arranging a monolayer interlayer film for calibration having a visible light transmittance of 88% between two sheets of clear float glass having a thickness of 2.5 mm; storing the laminated glass and the laminated glass for calibration in an environment of 23±2° C. for 4 hours or more so that a surface temperature of the laminated glass and the laminated glass for calibration is 23° C.; and measuring an optical strain value of the laminated glass by using the optical strain inspection apparatus that is adjusted so that an optical strain value in a condition that no measuring object is placed is 1.30 and an optical strain value of the laminated glass for calibration is 1.14 when a processing operation in the image processing part is executed, the processing operation in the image processing part including:
converting each pixel of the gray image to a numerical value of 0 to 255 according to the shading of the gray image, dividing a region of 400 pixels×400 pixels formed by connecting four points of pixel coordinates (120, 40), (520, 40), (120, 440), and (520, 440) of the gray image into 16 windows in total each containing 100 pixels×100 pixels; in each of the 16 windows, calculating a "variance of pixel values" for 100 pixels in each of a first column to a one hundredth column of pixel coordinates; determining an average "variance of pixel values", as an "optical strain of a window", from the "variance of pixel values" calculated in each of the first column to the one hundredth column; and determining an average "optical strain of a window", as an "optical strain of a measuring object", from the "optical strain of a window" determined in each of the 16 windows.

* * * * *